(12) United States Patent
Inoue

(10) Patent No.: US 11,831,824 B1
(45) Date of Patent: Nov. 28, 2023

(54) IMAGE PROCESSING APPARATUS, INFORMATION PROCESSING APPARATUS, IMAGE PROCESSING SYSTEM, IMAGE PROCESSING METHOD, INFORMATION PROCESSING METHOD, AND STORAGE MEDIUM

(71) Applicant: CANON KABUSHIKI KAISHA, Tokyo (JP)

(72) Inventor: Kenta Inoue, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/304,604

(22) Filed: Apr. 21, 2023

(30) Foreign Application Priority Data

May 13, 2022 (JP) .................................. 2022-079398

(51) Int. Cl.
*H04N 1/00* (2006.01)
*G06V 30/19* (2022.01)

(52) U.S. Cl.
CPC ... *H04N 1/00408* (2013.01); *G06V 30/19093* (2022.01); *H04N 1/00209* (2013.01); *H04N 2201/0094* (2013.01)

(58) Field of Classification Search
CPC .............. G06F 3/0482; G06F 3/04845; G06F 3/04883; G06F 3/04886; G06F 40/166; G06F 40/174; H04N 1/00411; H04N 1/00217; H04N 1/00244; H04N 1/00408; H04N 1/00482; H04N 1/0097; H04N 1/32101; H04N 1/4433; H04N 2201/0094; H04N 2201/3243; H04N 1/00209; G06V 30/1444; G06V 30/19093
USPC .......................................................... 358/1.15
See application file for complete search history.

(56) References Cited

U.S. PATENT DOCUMENTS

| | | | |
|---|---|---|---|
| 8,390,862 B2 * | 3/2013 | Matsuno | F16K 27/067 358/1.18 |
| 2007/0133882 A1 * | 6/2007 | Matsuno | H04N 1/32133 715/272 |
| 2018/0121066 A1 * | 5/2018 | Kato | G06F 3/04845 |
| 2021/0049359 A1 * | 2/2021 | Mori | H04N 1/00331 |
| 2021/0306476 A1 * | 9/2021 | Inoue | H04N 1/00482 |
| 2022/0201146 A1 * | 6/2022 | Ito | G06V 30/19067 |
| 2023/0108397 A1 * | 4/2023 | Tokita | H04N 1/00811 358/453 |
| 2023/0156138 A1 * | 5/2023 | Soga | H04N 1/00209 358/1.9 |

FOREIGN PATENT DOCUMENTS

JP 2018-056797 A 4/2018

* cited by examiner

*Primary Examiner* — Negussie Worku
(74) *Attorney, Agent, or Firm* — Venable LLP

(57) ABSTRACT

The image processing apparatus obtains scanned images of each page obtained by scanning business forms including a plurality of pages or business forms of different types collectively, manages a division method associated with feature information on each of previous scanned images and the previous scanned images, analyzes, based on the feature information, whether any of the previous scanned images similar to a scanned image of the first page of the obtained scanned images exists, and divides, in a case where any of the previous scanned images similar to the scanned image of the first page exists, the obtained scanned images by a division method associated with the previous scanned image similar to the scanned image of the first page.

16 Claims, 18 Drawing Sheets

|      | Key             | Value                                  |
|------|-----------------|----------------------------------------|
| 1103 | matched         | FALSE                                  |
| 1104 | formID          | aaaaaaaa-ffff-49ab-acf8-55558888eeee   |
| 1105 | Division method | Undefined                              |
| 1106 | Same pages      | 3, 6, 7, 10                            |
| 1107 | Barcode pages   | 2, 5                                   |
| 1108 | Blank pages     | 9                                      |
| 1109 | N pages         | -                                      |
| 1110 | All pages       | 13                                     |

1101 = Key column, 1102 = Value column

FIG.11A

|      | Key             | Value                                  |
|------|-----------------|----------------------------------------|
| 1103 | matched         | FALSE                                  |
| 1104 | formID          | bbbbbbbb-gggg-23ab-acf4-23121111fffff  |
| 1105 | Division method | Undefined                              |
| 1106 | Same pages      | -                                      |
| 1107 | Barcode pages   | -                                      |
| 1108 | Blank pages     | -                                      |
| 1109 | N pages         | -                                      |
| 1110 | All pages       | 13                                     |

FIG.11B

|      | Key             | Value                                  |
|------|-----------------|----------------------------------------|
| 1103 | matched         | TRUE                                   |
| 1104 | formID          | ccccccc-hhhh-89ab-acf5-83719999gggg    |
| 1105 | Division method | Same                                   |
| 1106 | Same pages      | 3, 5, 9                                |
| 1107 | Barcode pages   | -                                      |
| 1108 | Blank pages     | -                                      |
| 1109 | N pages         | -                                      |
| 1110 | All pages       | 10                                     |

FIG.11C

| No | Form ID | Division method | N pages | Created Users | Group |
|---|---|---|---|---|---|
| 1 | aaaaaaaa-ffff-49ab-acf8-55558888eeee | Same | - | user1 | groupA |
| 2 | bbbbbbbb-gggg-23ab-acf4-23121111ffff | N | 3 | user2 | groupA |
| 3 | cccccccc-hhhh-89ab-acf5-83719999gggg | Barcode | - | user1 | groupA |
| 4 | dddddddd-kkkk-76ci-uar8-56709712jjjj | Blank | - | user3 | groupB |

1301 — Form ID
1302 — Division method
1303 — N pages
1304 — Created Users
1305 — Group

FIG.13

IMAGE PROCESSING APPARATUS, INFORMATION PROCESSING APPARATUS, IMAGE PROCESSING SYSTEM, IMAGE PROCESSING METHOD, INFORMATION PROCESSING METHOD, AND STORAGE MEDIUM

BACKGROUND OF THE INVENTION

Field of the Invention

The present invention relates to a technique to divide scanned images of each page.

Description of the Related Art

One of purposes of a user scanning a business form, there is computerization of a paper business form. By storing a file obtained by computerizing a business form in a cloud storage, it is possible for a user to check the contents of a business form irrespective of time and place. Further, by computerizing a business form, it is possible to reduce the storage space of paper business forms. Furthermore, there is a method of computerizing scanned images of each page obtained by scanning a plurality of documents by dividing the scanned images into each aggregate of scanned images desired by a user. A plurality of methods has been proposed as a division method at the time of dividing scanned images of each page.

Japanese Patent Laid-Open No. 2018-56797 has disclosed a method in which a user selects a division method each time from among one-page division, predetermined number of pages division, arbitrary number of pages division, and automatic division.

With the method as in Japanese Patent Laid-Open No. 2018-56797, in which a user selects a division method in accordance with a scan-target business form, even in a case where similar business forms are scanned repeatedly, it is necessary for the user to select a division method each time, and therefore, there occur time and effort of the user.

SUMMARY OF THE INVENTION

The image processing apparatus of the present invention has: at least one memory that stores instructions; and at least one processor that executes the instructions to: obtain scanned images of each page obtained by scanning business forms including a plurality of pages or business forms of different types collectively; manage a division method associated with feature information on each of previous scanned images and the previous scanned images; analyze, based on the feature information, whether any of the previous scanned images similar to a scanned image of the first page of the obtained scanned images exists; and divide, in a case where any of the previous scanned images similar to the scanned image of the first page exists, the obtained scanned images by a division method associated with the previous scanned image similar to the scanned image of the first page.

Effects of the Present Invention

Further features of the present invention will become apparent from the following description of exemplary embodiments with reference to the attached drawings.

BRIEF DESCRIPTION OF THE DRAWINGS

FIG. 11A to FIG. 11C are each a diagram showing an example of analysis results information;

FIG. 13 is a diagram showing an example of a management structure of a division method;

DESCRIPTION OF THE EMBODIMENTS

In the following, aspects for embodying the technique of the present invention are explained by using the drawings. The following embodiments are not intended to limit the technique according to the scope of the claims and all combinations of features explained in the following embodiments are not necessarily indispensable to the solution of the technique of the present invention.

First Embodiment

[System Configuration]

Figure 1A:
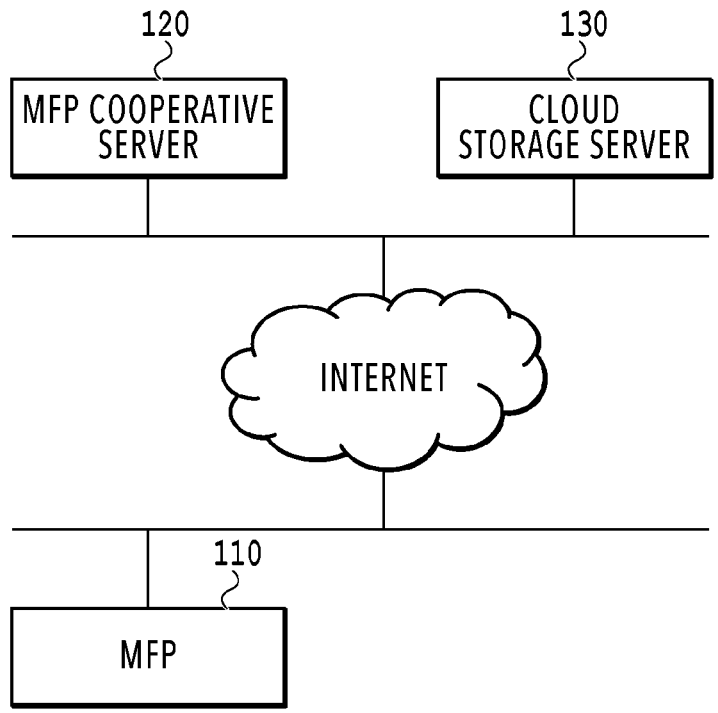
FIG. 1A and FIG. 1B are each a diagram showing a general configuration of the present system.
Figure 1B:
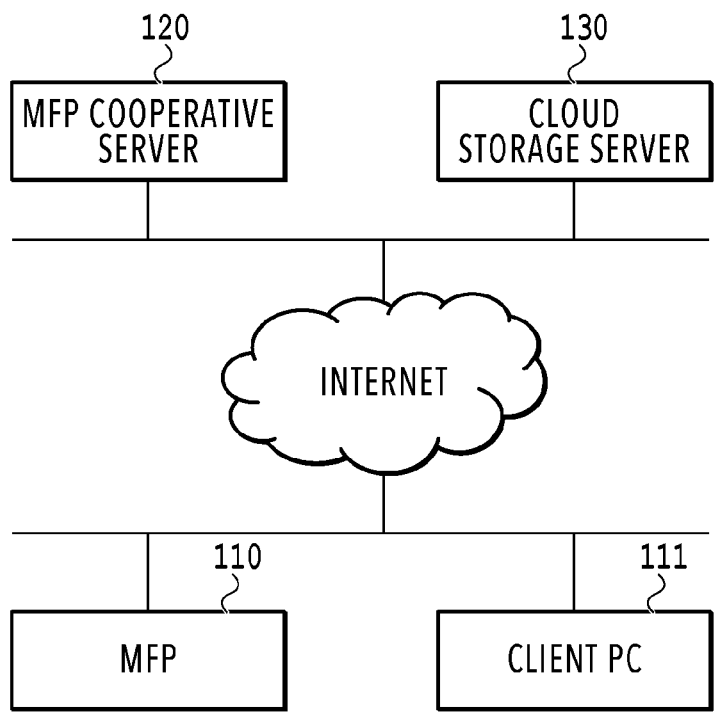

FIG. 1A and FIG. 1B are each a diagram showing a generation configuration of an image processing system according to the present embodiment. First, the image processing system in FIG. 1A is explained. FIG. 1B will be explained in a second embodiment, to be described later. The image processing system in FIG. 1A has an MFP (Multifunction Peripheral) 110, an MFP cooperative server 120, and a cloud storage server 130. The MFP 110 is connected to a server that provides various services on the internet via a LAN (Local Area Network) so as to be capable of communication.

The MFP 110 is a multifunction peripheral having a plurality of functions, such as those as a scanner and a printer, and is an example of an image forming apparatus. The MFP 110 is an image forming apparatus that cooperates with a cloud server that provides services, such as cloud storage. The image forming apparatus such as this has a function to transmit data of a generated scanned image in order to store a scanned image obtained by scanning a business form in a cloud storage designated by a user.

The MFP cooperative server 120 is an example of a server that provides services, such as a service to store an image file obtained by the MFP 110 performing a scan in the server itself and a service to transfer the image file to another server that provides a storage service to store a file, and the like. In the following, the cloud service that is provided by the MFP cooperative server 120 is called "MFP cooperative service".

The cloud storage server 130 is a server that provides services, such as a service to store a file received via the internet and a service to enable an external device to obtain a file via a web browser. In the image processing system, a plurality of cloud storage services exists, not limited to the cloud storage server 130. In the following, the cloud service that is provided by the cloud storage server 130 is called "cloud storage service".

The image processing system of the present embodiment has the configuration including the MFP 110, the MFP cooperative server 120, and the cloud storage server 130, but the configuration is not limited to this. For example, it may also be possible for the MFP 110 to have the role of the MFP cooperative server 120. Further, the configuration may be a connection aspect in which the MFP cooperative server 120 is arranged in a server on a LAN, not on the internet. Further, it may also be possible to replace the cloud storage server 130 with a mail server or the like and to transmit a scanned image by attaching it to a mail.

[Hardware Configuration of MFP]

Figure 2:
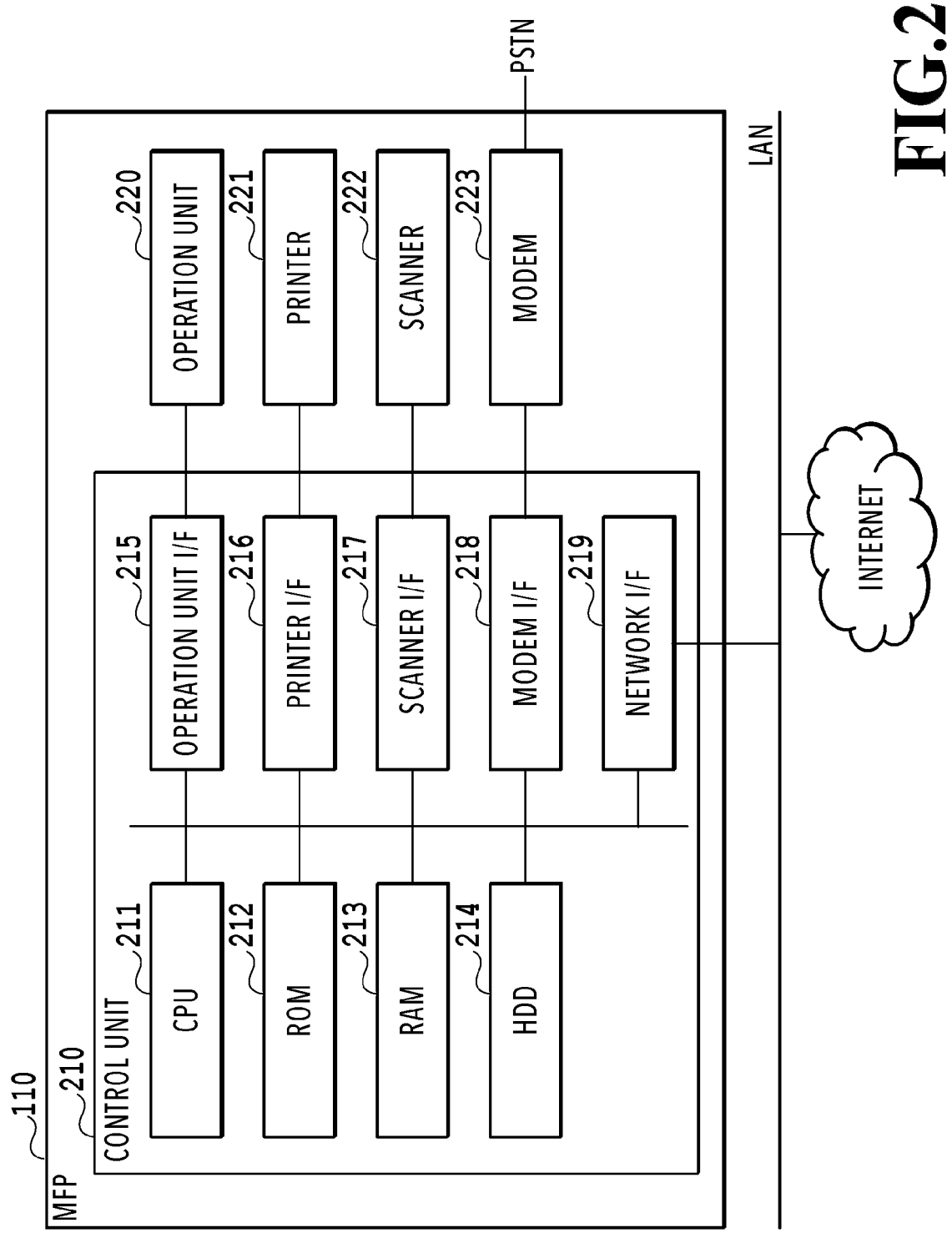
FIG. 2 is a hardware configuration diagram of an MFP.

FIG. 2 is a block diagram showing the hardware configuration of the MFP 110. The MFP 110 has a control unit 210, an operation unit 220, a printer 221, a scanner 222, and a modem 223.

The control unit 210 includes each of units 211-219 below and controls the entire operation of the MFP 110. The CPU 211 reads and executes a variety of control programs (programs corresponding to various functions shown in the function configuration diagram in FIG. 4) stored in the ROM 212. The RAM 213 is used as a temporary storage area, such as a main memory and a work area, of the CPU 211. In the present embodiment, the one CPU 211 performs each piece of processing shown in flowcharts, to be described later, by using the one memory (RAM 213 or HDD 214), but the present embodiment is not limited to this. For example, it may also be possible to perform each piece of processing by causing a plurality of CPUs and a plurality of RAMs or a plurality of HDDs to cooperate. The HDD 214 is a large-capacity storage unit configured to store image data and various programs.

The operation unit I/F 215 is an interface that connects the operation unit 220 and the control unit 210. The operation unit 220 is provided with a touch panel, which also functions as a display unit, a keyboard and the like and receives operations/inputs/instructions by a user. The touch operation to the touch panel includes the operation with a human finger and the operation with a touch pen.

The printer I/F 216 is an interface that connects the printer 221 and the control unit 210. Image data to be printed is transferred from the control unit 210 to the printer 221 via the printer I/F 216 and printed on a printing medium, such as paper.

The scanner I/F 217 is an interface that connects the scanner 222 and the control unit 210. The scanner 222 generates a scanned image by optically reading a document set on a document table or an ADF (Auto Document Feeder), both not shown schematically, and inputs the scanned image to the control unit 210 via the scanner I/F 217. It is possible to print (copy and output) the scanned image generated by the scanner 222, store it in the HDD 214, transmit it to an external apparatus, such as the MFP cooperative server 120, via a LAN as a file, and so on.

The modem I/F 218 is an interface that connects the modem 223 and the control unit 210. The modem 223 performs facsimile communication of image data with a facsimile device (not shown schematically) on the PSTN.

The network I/F 219 is an interface that connects the control unit 210 (MFP 110) to a LAN. The MFP 110 transmits scanned image data to the MFP cooperative server 120, receives various kinds of data from the MFP cooperative server 120, and so on. The hardware configuration of the MFP 110 explained above is an example and the hardware configuration may be one comprising another configuration as needed, or one that does not have part the configurations.

[Hardware Configuration of MFP Cooperative Server]

Figure 3:
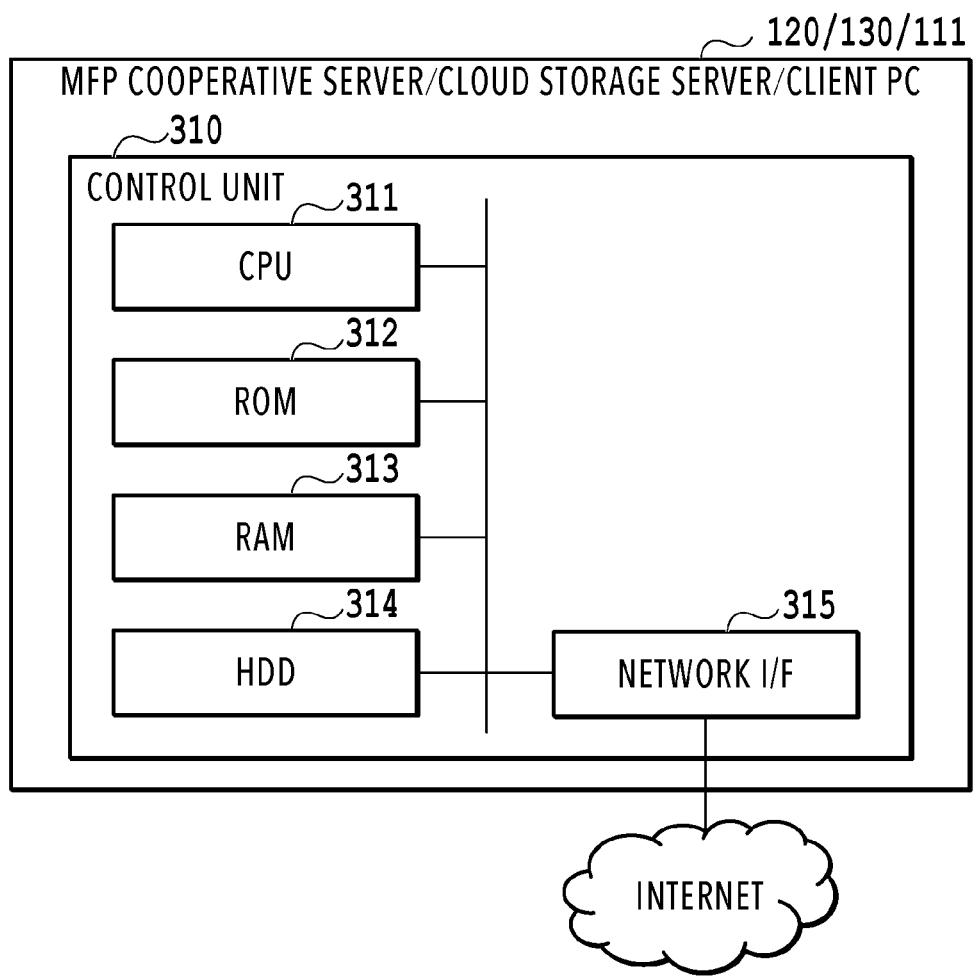
FIG. 3 is a hardware configuration diagram of an MFP cooperative server, a cloud storage server, and a client PC.

FIG. 3 is the block diagram showing the hardware configuration of the MFP cooperative server 120, the cloud storage server 130, or a client PC 111, to be described later. The MFP cooperative server 120, the cloud storage server 130, and the client PC 111 each have a CPU 311, a ROM 312, a RAM 313, an HDD 314, and a network I/F 315. The CPU 311 controls the entire operation by reading control programs stored in the ROM 312 and performing various kinds of processing. The RAM 313 is used as a temporary storage area, such as a main memory and a work area, of the CPU 311. The HDD 314 is a large-capacity storage unit configured to store image data and various programs. The network I/F 315 is an interface that connects the control unit 310 to the internet. The MFP cooperative server 120, the cloud storage server 130, and the client PC 111 receive requests for various kinds of processing from another apparatus (such as MFP 110) via the network I/F 315 and return processing results in accordance with the requests.

[Function Configuration of Image Processing System]

Figure 4:
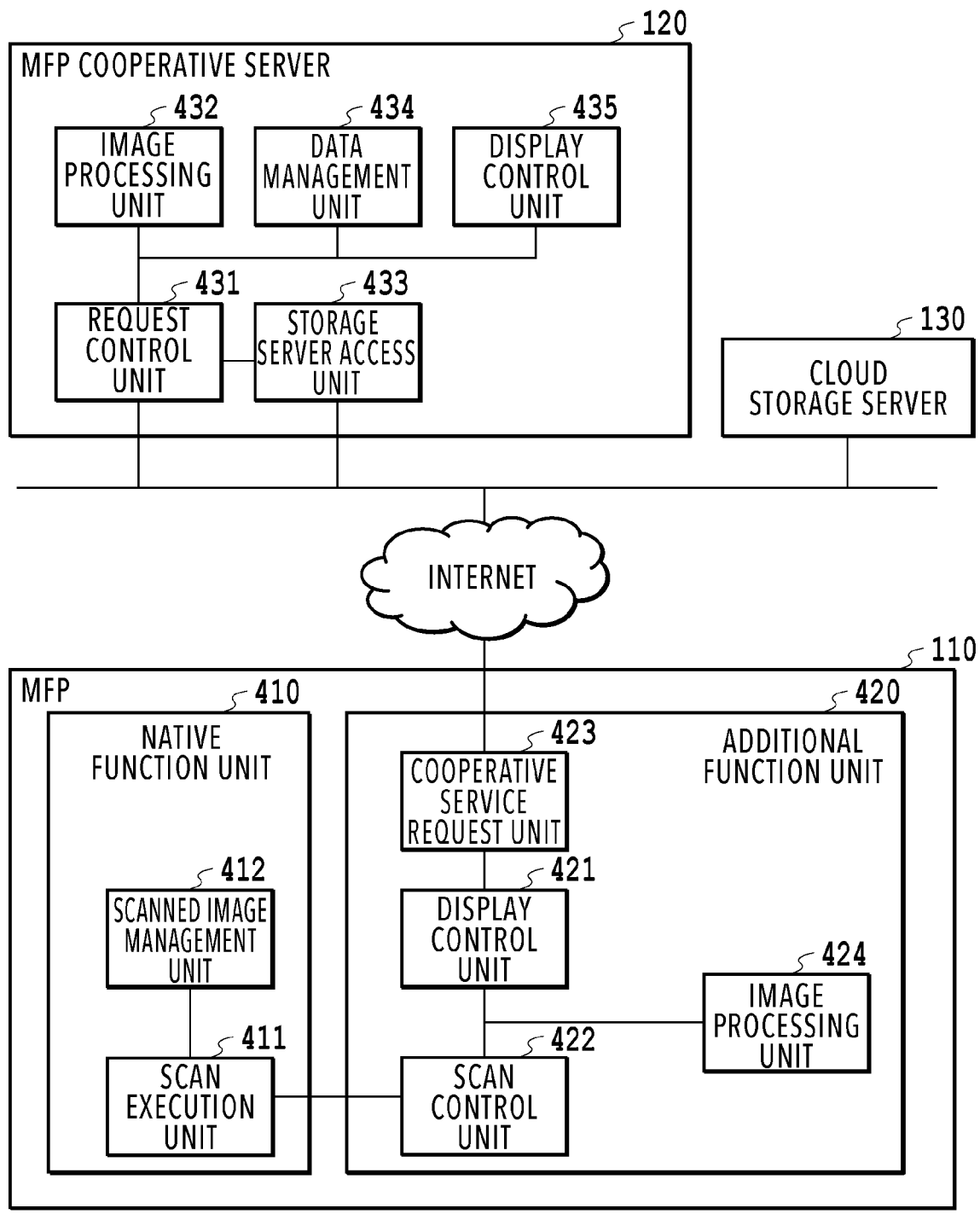
FIG. 4 is a function configuration diagram of the present system.

FIG. 4 is a block diagram showing the function configuration of the image processing system according to the present embodiment. In the following, the function configurations corresponding to the roles of each of the MFP 110 and the MFP cooperative server 120 configuring the image processing system are explained in order. In the following, explanation is given by narrowing the various functions of each apparatus to the functions relating to the processing to computerize (file) a document by performing a scan and store it in the cloud storage server 130.

[Function Configuration of MFP]

The MFP 110 also includes the functions of the information processing apparatus and has two function modules of a native function unit 410 and an additional function unit 420. While the native function unit 410 is an application that is comprised as a standard one in the MFP 110, the additional function unit 420 is an application that is installed additionally in the MFP 110. The additional function unit 420 is an application based on Java (registered trademark) and addition of a function to the MFP 110 can be implemented easily. It may also be possible for another additional application, not shown schematically, to be installed in the MFP 110.

The native function unit 410 has a scan execution unit 411 and a scanned image management unit 412. Further, the additional function unit 420 has a display control unit 421, a scan control unit 422, a cooperative service request unit 423, and an image processing unit 424.

The display control unit 421 displays a user interface screen (UI screen) for receiving various user operations on a touch panel of the operation unit 220. Various user operations include, for example, input of log-in authentication information for accessing the MFP cooperative server 120, scan setting, instructions to start a scan, file name setting, instructions to save a file, and the like.

The scan control unit 422 instructs the scan execution unit 411 to perform scan processing based on the scan setting in accordance with the user operation (for example, pressing down of "Start scan" button) performed via the UI screen.

The scan execution unit 411 generates a scanned image by causing the scanner 222 to perform the document reading operation via the scanner I/F 217 in accordance with instructions to perform scan processing from the scan control unit 422.

The scanned image management unit 412 stores data of the generated scanned image in the HDD 214. At this time, the scan control unit 422 is notified of information on the scanned image identifier uniquely indicating the stored data of the scanned image. The scanned image identifier is a number, symbol, alphabet letter or the like for uniquely identifying an image scanned in the MFP 110. For example, it is possible for the scan control unit 422 to obtain filing-target scanned image data from the scanned image management unit 412 by using the above-described scanned image identifier. Then, the scan control unit 422 instructs the cooperative service request unit 423 to make a request for processing necessary for filing to the MFP cooperative server 120.

The cooperative service request unit 423 functions as a transmission unit or a reception unit configured to transmit a request for various kinds of processing to the MFP cooperative server 120 or receive a response to the request. The various kinds of processing include, for example, log-in authentication, scanned image analysis, scanned image data transmission and the like. For transmission and reception with the MFP cooperative server 120, a communication protocol, such as REST and SOAP, is used. The image processing unit 424 performs predetermined processing for scanned image data. It may also be possible for an apparatus (information processing apparatus, such as client PC 111) different from the MFP 110 to comprise part of the functions implemented by the above-described additional function unit 420 and the like.

The function units of the MFP 110 are implemented by the CPU 211 reading programs stored in the ROM 212 or the HDD 214 of the MFP 110 onto the RAM 213 and executing the programs.

[Function Configuration of Server Apparatus]

The function configuration of the MFP cooperative server 120 is explained by using FIG. 4. The MFP cooperative server 120 has a request control unit 431, an image processing unit 432, a storage server access unit 433, a data management unit 434, and a display control unit 435.

The request control unit 431 also functions as a reception unit configured to receive a request from an external apparatus and stands by in the state of being capable of receiving a request from an external apparatus. Then, the request control unit 431 instructs the image processing unit 432, the storage server access unit 433, the data management unit 434, and the display control unit 435 to perform predetermined processing in accordance with contents of the received request. For example, the request control unit 431 performs control so that log-in processing is performed in accordance with a login request from the MFP 110.

The image processing unit 432 performs character string area detection processing and character recognition processing (Optical Character Recognition processing or OCR processing) for the scanned image data that is sent from the MFP 110. Further, the image processing unit 432 performs analysis processing, such as similar business form determination processing to determine a similar business form similar to the business form scanned this time. In addition, the image processing unit 432 performs image modification processing, such as rotation and inclination correction. Details of similar business form determination will be described later. Further, explanation is given by taking a business form, such as an estimate form and a bill, as an example as a target document and there is a case where the scanned image obtained by scanning the business form is called a business form image.

The storage server access unit 433 makes a request for processing to the cloud storage server 130. The cloud storage server 130 has made public a variety of interfaces for storing a file within the cloud storage server 130, obtaining a stored file, and so on by using a protocol, such as REST and SOAP. The storage server access unit 433 makes a request to the cloud storage server 130 by using the interface made public.

The data management unit 434 stores and manages user information, image analysis results information, various kinds of setting data and the like in an HDD and the like, which are managed by the MFP cooperative server 120.

The display control unit 435 performs control so that a screen is displayed by transmitting screen information necessary for displaying a screen to the MFP 110, the PC client 111 connected via the internet, or a mobile terminal (not shown schematically). For example, the display control unit 435 receives a request from a web browser running on the client PC 111 or a mobile terminal (not shown schematically) and returns screen information (HTML, CSS and the like) necessary for displaying a screen. It is possible for a user to check registered user information, change scan setting, select a division method, and so on via a screen displayed by the web browser and the like.

[Flow of General Processing]

Figure 5A:
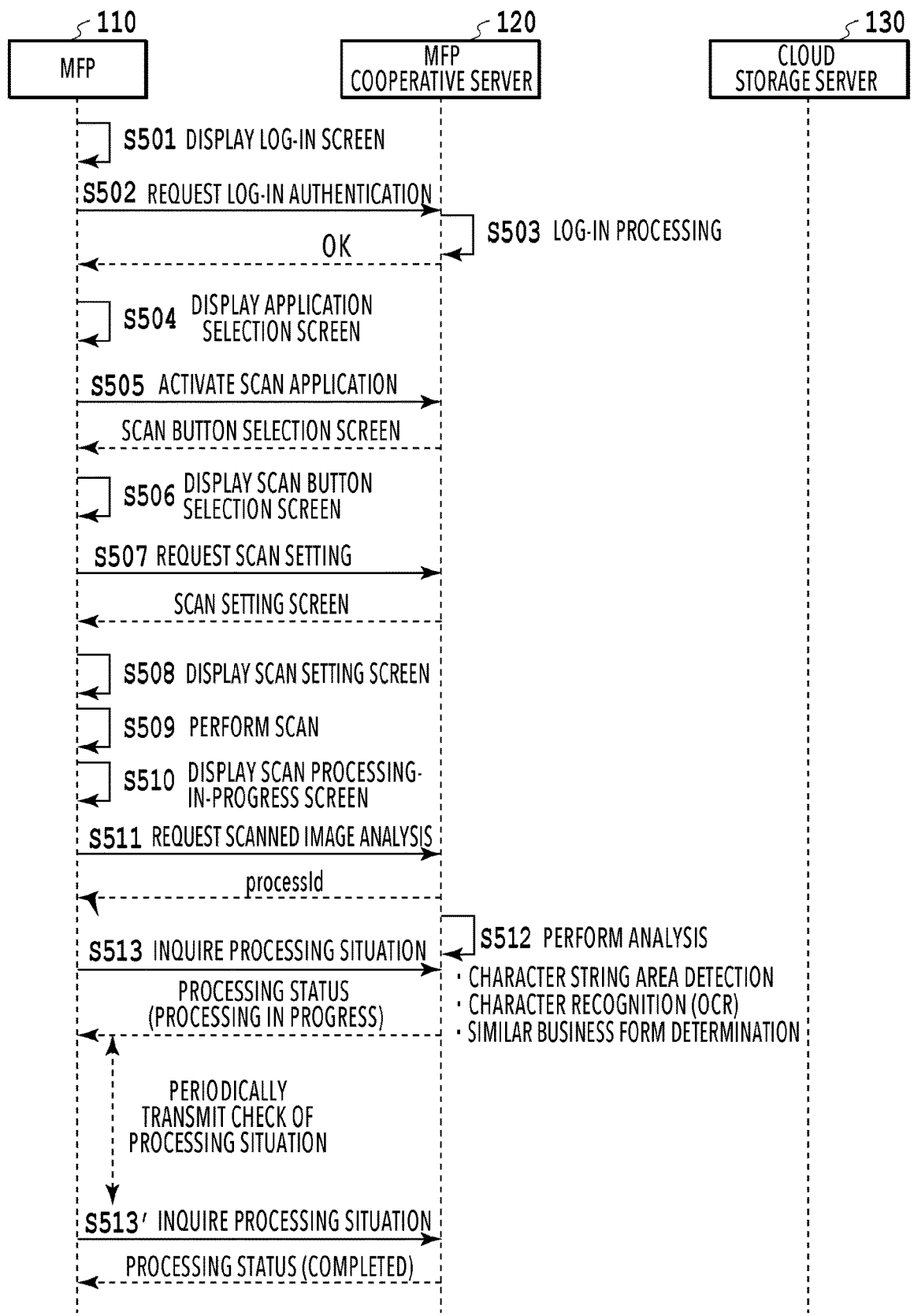
FIG. 5A is a sequence diagram showing a flow of processing between each apparatus.
Figure 5B:
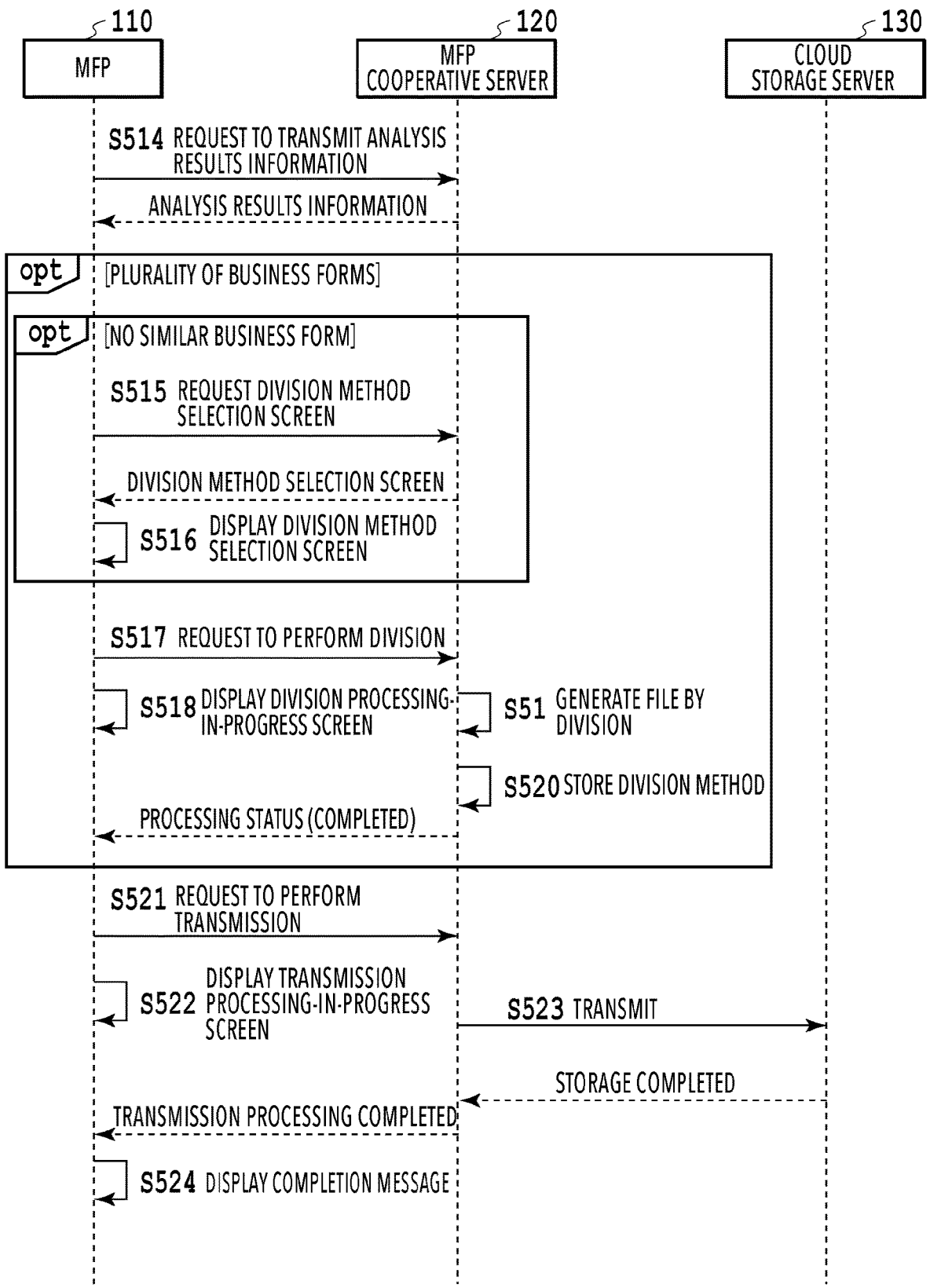
FIG. 5B is a sequence diagram showing a flow of processing between each apparatus.

FIG. 5A and FIG. 5B are each a sequence diagram showing a flow of processing between the apparatuses in a case where the MFP 110 scans a business form and files a scanned image obtained as a result of the scan and stores it in the storage server. There is a case where FIG. 5A and FIG. 5B are called together FIG. 5. In the following, the operations performed between the apparatuses are explained in a time series along the sequence diagram in FIG. 5. In the following explanation, a symbol "S" means a step.

At S501, the display control unit 421 of the MFP 110 displays a UI screen (in the following, described as "log-in screen"), not shown schematically, on which to input information on log-in authentication for accessing the MFP cooperative server 120, on the operation unit 220 of the MFP 110.

At S502, in a case where a user inputs each of a user ID and a password, which are registered in advance, in an input field on the log-in screen, and presses down "Login" button, a request for log-in authentication is transmitted to the MFP cooperative server 120.

At S503, the MFP cooperative server 120 having receives the request for log-in authentication performs authentication processing using the user ID and the password included in the request. In a case where it is checked that the user is a genuine user as a result of the authentication processing, the MFP cooperative server 120 returns an access token to the MFP 110. After this, by sending this access token together in a case where the MFP 110 makes various requests to the MFP cooperative server 120, the log-in user is specified. In the present embodiment, it is assumed that in a case where login to the MFP cooperative server 120 is completed, login to the cloud storage server 130 is also completed at the same time. Because of this, a user associates the user ID for utilizing the MFP cooperative service and the user ID for utilizing the storage service with each other in advance via a web browser and the like of the PC on the internet. Due to this, in a case where the log-in authentication to the MFP cooperative server 120 succeeds, the log-in authentication to the cloud storage server 130 is also completed at the same time, and therefore, it is possible to omit the operation to login to the cloud storage server 130. Then, it is also made possible for the MFP cooperative server 120 to deal with a request for the storage service from a user having logged in to the MFP cooperative server 120 itself. As the log-in authentication method, it may be possible to use a method publicly known generally (Basic authentication, Digest authentication, authorization using OAuth, and the like).

At S504, in a case where the log-in processing is completed, the display control unit 421 of the MFP 110 displays a UI screen (in the following, described as "main screen") on which an application can be selected on the operation unit 220 and displays applications that can be utilized by the MFP 110 on the main screen.

Figure 6A:
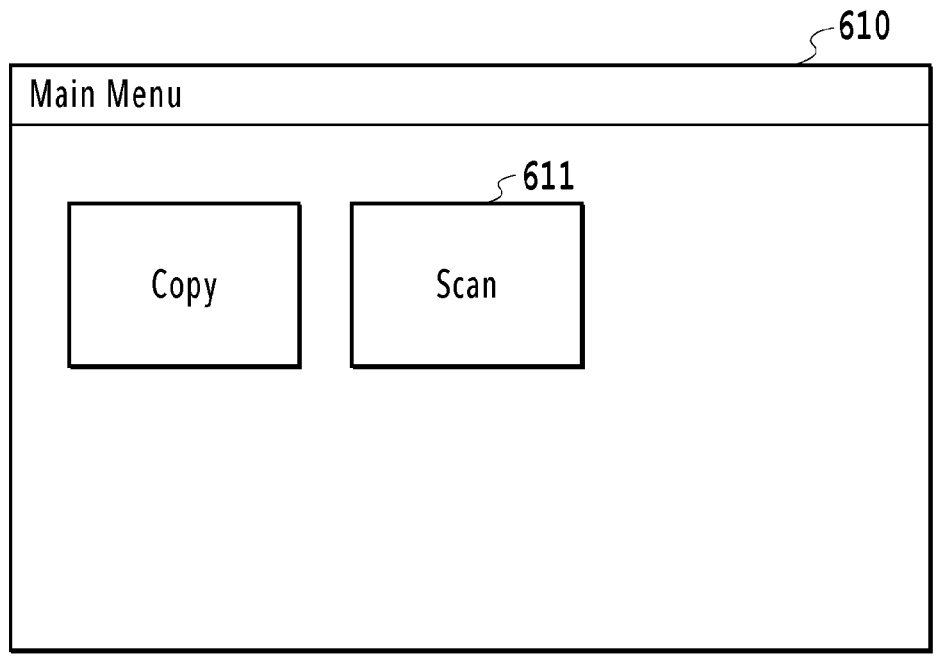
FIG. 6A and FIG. 6B are each a diagram showing an example of a scan button selection screen.

FIG. 6A is a diagram showing an example of the main screen. By a dedicated application for filing a business form by performing a scan and storing the file in the cloud storage server being installed in the MFP 110, buttons for starting a dedicated application are displayed on a main screen 610.

At S505, in a case where a user presses down a Scan application 611 on the main screen 610, the cooperative service request unit 423 transmits a request to activate the Scan application to the MFP cooperative server 120. The MFP cooperative server 120 obtains information necessary for displaying a button selection screen of scan processing that can be utilized by a log-in user from the HDD of the MFP cooperative server 120 and transmits the information to the MFP 110.

At S506, the display control unit 421 of the MFP 110 displays a scan button selection screen on the operation unit 220 based on the information received from the MFP cooperative server 120.

Figure 6B:
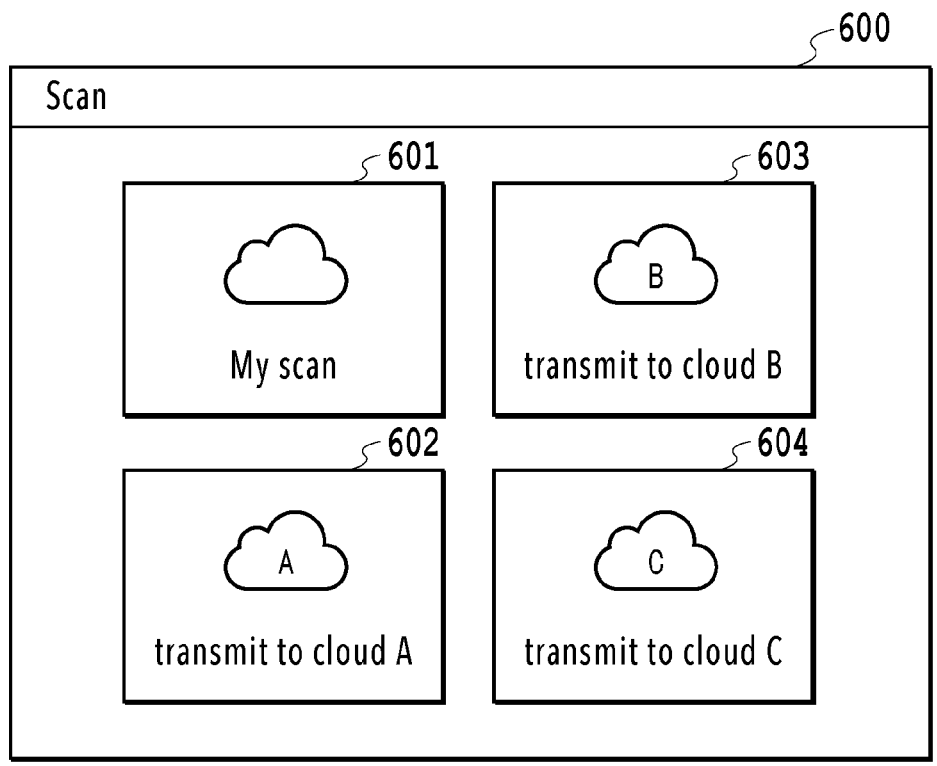

FIG. 6B is a diagram showing an example of a Scan button selection screen 600. Buttons 601 to 604 in FIG. 6B are buttons that can be utilized by a log-in user among scan buttons registered in the MFP cooperative server 120. It is possible for a user to register the setting relating to the scan or transmission in advance to the HDD of the MFP cooperative server 120. The scan buttons in accordance with the setting registered in advance by a log-in user are displayed on the Scan button selection screen 600. At each step in the following, explanation is given by assuming that a user selects the button 601.

At S507, in a case where a user selects the button 601, the cooperative service request unit 423 makes a request to transmit the scan setting that is set as default to the selected button 601 to the MFP cooperative server 120. The MFP cooperative server 120 obtains the scan setting of default of the selected button 601 and information necessary for displaying the scan setting screen from the HDD of the MFP cooperative server 120 in response to the request to transmit the scan setting and transmits them to the MFP 110.

At S508, the display control unit 421 of the MFP 110 displays the scan setting screen on the operation unit 220 of the MFP 110 based on the information received from the MFP cooperative server 120.

Figure 7:
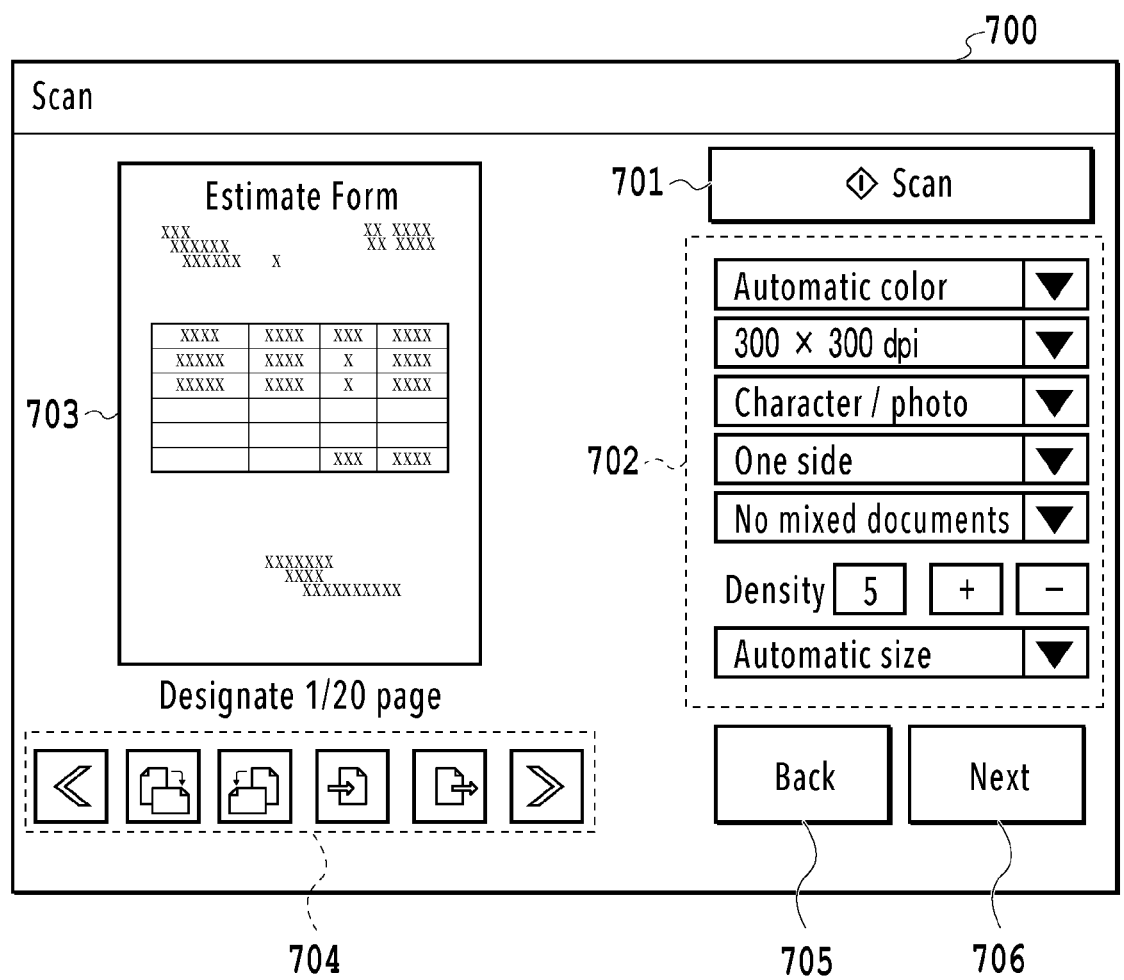
FIG. 7 is a diagram showing an example of a scan setting screen.

FIG. 7 is a diagram showing an example of a Scan setting screen 700. A Scan button 701 is a button for giving instructions to perform a scan. A setting area 702 is an area in which the current scan settings, such as color, resolution, image quality, both sides, mixed document sizes, density, and document size, are displayed. By selecting the scan setting displayed in the setting area 702, the scan setting that is changed is received. A button 705 is a button to return to the Scan button selection screen 600.

At S509, in a case where a user presses down the Scan button 701, the scanner 222 performs a scan for a scan-target paper business form placed on a document table glass or ADF. Then, the scan execution unit 411 generates data of a scanned image obtained by reading the scanned paper business form. In a case where a paper business form having a plurality of pages is scanned on the document table glass, by replacing the paper business form with the paper business form to be scanned next and pressing down the Scan button 701, it is possible to successively scan a plurality of business forms.

As a result of performing a scan, in a preview area 703 on the Scan setting screen 700, a preview of a scanned document is displayed. Buttons 704 are buttons for performing page forward, page rotation, page deletion, and page addition (additional scan) of an image that is displayed in the preview area 703. A Next button 706 is a button to advance the processing for the scanned image being preview-displayed to the next processing.

At S510, in a case where the Next button 706 is pressed down, the display control unit 421 of the MFP 110 displays a scan processing-in-progress screen on the operation unit 220 of the MFP 110.

At S511, the cooperative service request unit 423 of the MFP 110 transmits the scanned image obtained by the scan at S509 to the MFP cooperative server 120 along with a request to analyze the scanned image. The scanned image received by the MFP cooperative server 120 is stored in the HDD within the MFP cooperative server 120 until it is transmitted to the cloud storage server 130.

At S512, upon receipt of the request to analyze the scanned image from theMFP 110, the image processing unit 432 of the MFP cooperative server 120 starts to analyze the scanned image. After that, the MFP cooperative server 120 returns an identifier "processId", by which it is possible to uniquely specify the requested analysis, to the MFP 110 without waiting until the analysis processing is completed.

The image processing unit 432 performs processing to detect a character string area existing within the analysis-target scanned image in the analysis processing at S512. For the character string area detection, it may be possible to apply a known method, such as a method of extracting a rectangular area estimated as a character from an image for which binarization has been performed with a certain threshold value. Next, the image processing unit 432 performs character recognition (OCR: Optical Character Recognition) processing for the detected character string area.

Then, the image processing unit 432 performs processing (business form determination processing) to determine whether the analysis-target scanned image and the scanned image registered as training data are similar by comparing the features of them. The scanned image registered as training data is a scanned image of a business form scanned previously and the business form corresponding to the previous scanned image registered as training data is called a registered business form. As information on the registered previous scanned image, information on the feature of the scanned image is stored. In the business form determination processing, whether there is any of previous scanned images similar to the scanned image obtained by performing a scan this time in the training data is determined. Then, the MFP cooperative server 120 stores analysis results information, which is information on the analysis-target scanned image obtained as a result of the analysis, in the HDD of the MFP cooperative server 120. Details of the analysis processing at S512 will be described later.

While the above-described analysis processing is being performed, the MFP 110 makes an inquiry about the processing situation periodically (for example, every several hundred milliseconds to every several milliseconds) to the MFP cooperative server 120 by using the above-described "processId" (S513 to S513'). This inquiry is made repeatedly until the analysis processing completion response from the MFP cooperative server 120 is obtained. Upon receipt of the inquiry about the processing situation, the MFP cooperative server 120 checks the progression situation of the analysis processing corresponding to processId and returns a response indicating that the processing is in progress in a case where the analysis processing is not completed.

In the response, "status", which is an item indicating the current processing situation, is included and the current processing situation is indicated by a character string held in "status". For example, in a case where the character string that is held in "status" is "processing", it is indicated that the processing is in progress in the MFP cooperative server 120. In a case where the character string is "completed", it is indicated that the processing is completed. In a case where the character string is "failed", it is indicated that the processing has failed.

In a case where the processing of the MFP cooperative server 120 is completed (in a case where "status" is "completed"), the MFP 110 receives the processing completion status. Further, the MFP 110 receives the URL and the like indicating the storage destination in which information (analysis results information) representing the results of the analysis processing is stored from the MFP cooperative server 120 along with the processing completion status.

At S514, the cooperative service request unit 423 of the MFP 110 requests the MFP cooperative server 120 to transmit the analysis results information by using the URL received from the MFP cooperative server 120.

The subsequent steps are switched in accordance with whether there is a plurality of business forms scanned this time. Whether there is a plurality of business forms scanned this time is determined based on the analysis processing results information. There is a case where a user scans collectively business forms of different types. In this case, there is a plurality of business forms scanned this time. Even in a case where a business form of one type is scanned, on a condition that the business form consists of a plurality of pages, there is a plurality of business forms scanned this time.

In a case where there is a plurality of business forms scanned this time, the processing is further switched in accordance with whether the business form scanned this time is a new business form for which there is no registered previous scanned image similar to the scanned image obtained by performing a scan this time. In a case where there is a plurality of business forms scanned this time, at least S517 to S520 are performed and further, in a case where the business form scanned this time is a new business form, the processing at S515 to S516 is performed before S517 to S520 are performed. In the following explanation of FIG. 5, a case is explained where there is a plurality of business forms scanned this time and the business form scanned this time is a new business form.

At S515, the cooperative service request unit 423 of the MFP 110 requests the MFP cooperative server 120 to transmit information necessary for displaying a division method selection screen. The request control unit 431 of the MFP cooperative server 120 receives the request to transmit information necessary for displaying the division method selection screen. Then, the display control unit 435 of the MFP cooperative server 120 transmits a division method that can be applied to the scanned image of this time based on the analysis results information and information necessary for displaying the division method selection screen to the MFP 110.

At S516, the display control unit 421 of the MFP 110 displays the division method selection screen on the operation unit 220 based on the information necessary for displaying the division method selection screen, which is received from the MFP cooperative server 120. Division is processing to put together scanned images of each page into each aggregate of scanned images of a specific page and generate a file thereof.

Figure 8A:
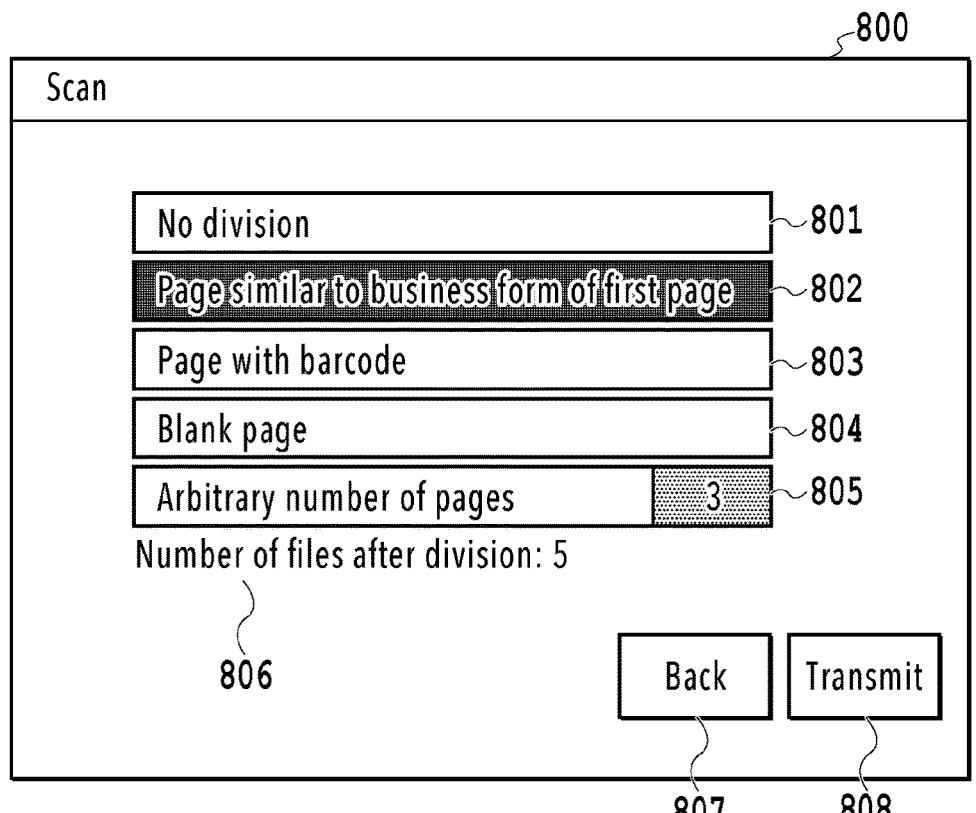
FIG. 8A and FIG. 8B are each a diagram showing an example of a division method selection screen.
Figure 8B:
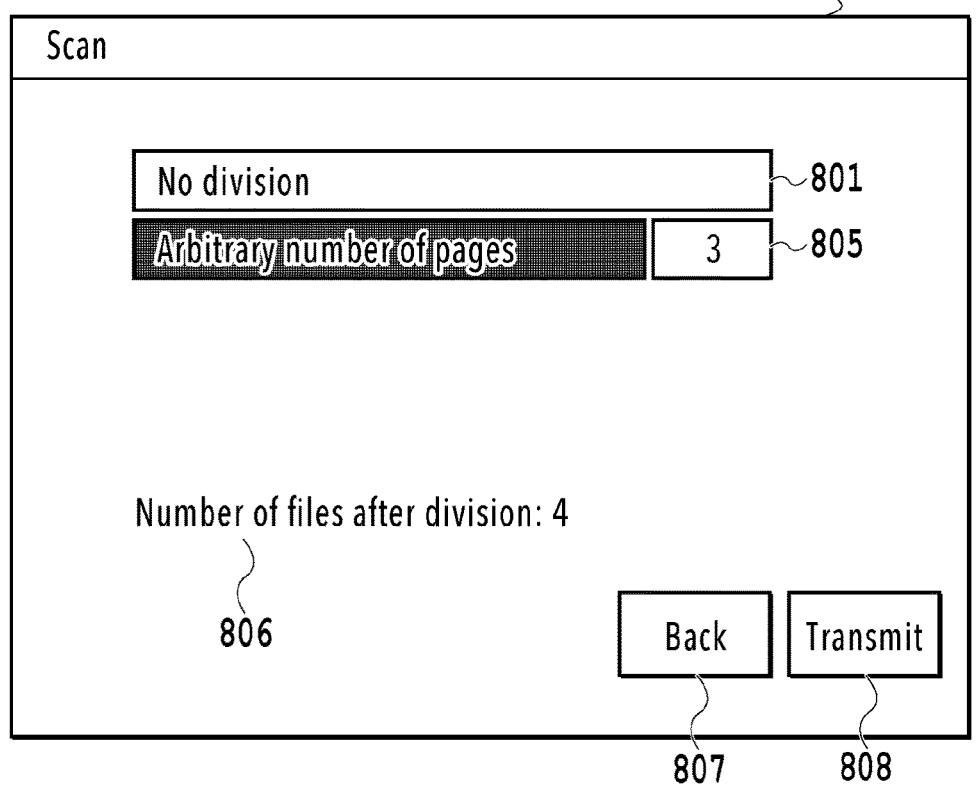

FIG. 8A and FIG. 8B are each a diagram showing an example of a division method selection screen 800 that is displayed on the operation unit 220 of the MFP 110. It is possible for a user to select a division method at the time of dividing scanned images of each page and generating a file thereof from the division method selection screen 800 by pressing down a button for selecting a division method displayed on the division method selection screen 800.

FIG. 8A is a diagram showing an example of the division method selection screen 800 generated so that all the division methods that can be processed by theMFP cooperative server 120 can be selected. In the present embodiment, it is assumed that there are four division methods that can be processed, that is, "Page similar to business form of first page", "Page with barcode", "Blank page", and "Arbitrary number of pages". Because of this, on the division method selection screen 800 in FIG. 8A, buttons 801 to 805 for selecting division methods are displayed so that a user can select one of the four division methods. The division methods that can be processed by the MFP cooperative server 120 are an example and the methods are not limited to these four methods.

Figure 9A:
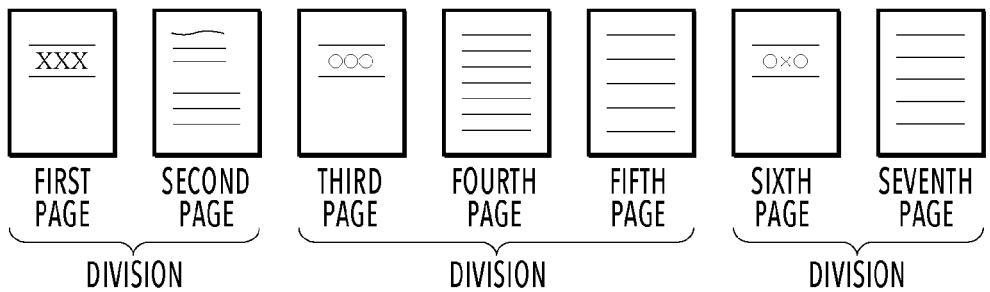
FIG. 9A to FIG. 9C are each a diagram for explaining division.
Figure 9B:
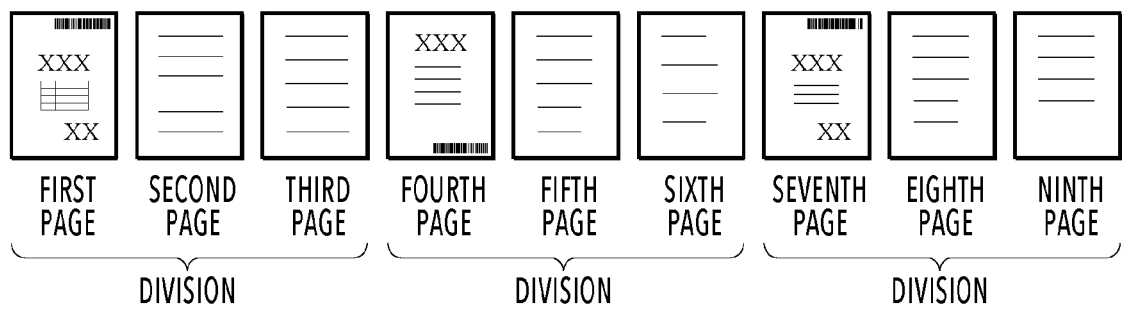
Figure 9C:
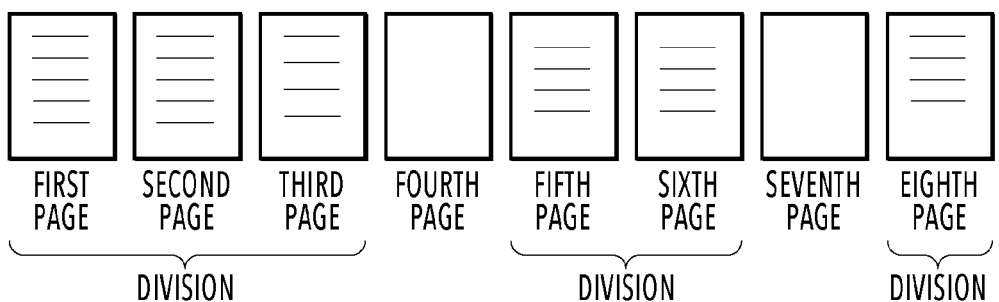

FIG. 9A to FIG. 9C are each a diagram for explaining the division method. FIG. 9A is a diagram for explaining the division method by "Page similar to business form of first page". In the division method by "Page similar to business form of first page", the pages from the first page (or page the same as or similar to the first page) to the page preceding the page for which the same as or similar to the first page was found next are divided from the scanned images of each page. Then, a file is generated for each divided pages. In a case of the scanned images in FIG. 9A, the pages similar to the first page are the third page and the sixth page. Because of this, according to this method, the scanned images are divided into the first page and the second page, the third page to the fifth page, and the sixth page and the seventh page, and a file is generated for each divided pages. This division method is suitable to the use in which, for example, business forms whose format of the first page is the same are scanned collectively and the scanned images are divided into separate files and stored by using the business form whose format is the same as the front page. The button 802 in FIG. 8A is a button for selecting the division method by "Page similar to business form of first page".

FIG. 9B is a diagram for explaining the division method by "Page with barcode". The division method by "Page with barcode" is a method in which the pages from the first page (or page with barcode) to the page preceding the next page with barcode are divided from the scanned images of each page and then, a file is generated for each divided pages. In a case of the scanned images in FIG. 9B, the first page, the fourth page, and the seventh page include a barcode. Because of this, the scanned images are divided into the first page to the third page, the fourth page to the sixth page, and the seventh page and the ninth page, and a file is generated for each divided pages. With this division method, for example, in a case where business forms of a plurality of types are scanned collectively and on the front page of the business form of each type, a barcode is printed, it is possible to divide the scanned images into each of the business forms of a plurality of types. The button 803 in FIG. 8A is a button for selecting the division method by "Page with barcode".

FIG. 9C is a diagram for explaining the division method by "Blank page". The division method by "Blank page" is a method in which the pages from the first page (or page next to the blank page) to the page preceding the next blank page are divided from the scanned images of each page and then, a file is generated for each divided pages. That is, this division method is a method in which the blank page that serves as a partition page is deleted and the pages are divided by taking the position from which the blank page has been deleted as a reference. In a case of FIG. 9C, the fourth page and the seventh page are blank pages, and therefore, the scanned images are divided into the first page to the third page, the fifth page to the sixth page, and the eighth page, and a file is generated for each divided pages. The button 804 in FIG. 8A is a button for selecting the division method by "Blank page".

The button 805 is a button for selecting the division method by "Arbitrary number of pages". The division method by "Arbitrary number of pages" is a method in which the number of pages including the first page, which is an arbitrary number designated by a user, is divided from the scanned images of each page and a file is generated for each divided scanned images of each page. It is possible for a user to designate the positions at which the division is performed by inputting numerical values before pressing down the button 805.

A display area 806 indicates the number of files that are generated in a case where the division method by the currently selected button of the buttons 802 to 805 is performed. By this numerical value, it is possible for a user to check whether the desired number of files can be obtained by the division method selected by the user him/herself. Although not shown schematically, it may also be possible to arrange buttons for making a transition into a preview screen of a business form and a divided position check screen indicating the divided pages in order to cause a user to check the exact divided positions.

The button 801 is a button for giving instructions to generate a file without division. A button 807 is a button to return to the Scan setting screen 700. A Transmit button 808 is a button for transmitting the division method selected by a user to theMFP cooperative server 120.

At S517, the cooperative service request unit 423 of the MFP 110 transmits instructions to perform division to the MFP cooperative server 120 along with the division method. Details of this step will be described later.

At S518, the display control unit 421 of the MFP 110 displays a screen (not shown schematically) for notifying a user that the division processing is in progress.

At S519, the image processing unit 432 of the MFP cooperative server 120 divides the scanned images of each page obtained by performing a scan this time by the division method transmitted from the MFP 110 at S517 and generates a file for each divided pages. In the file generation, the file format that is set in association with the button 601 selected on the Scan button selection screen 600 is read from the HDD of the MFP cooperative server 120. Then, the read file format is used as the file format of a file that is generated.

At S520, the data management unit 434 of the MFP cooperative server 120 stores the division method selected by a user this time at S516 in a case where the business form scanned this time is a business form determined to be a new business form that is not scanned previously. The division method selected by a user is managed by division setting information (see FIG. 13). The division setting information is information for storing a new formID uniquely indicating the type of form of the business form of the first page of the new business form scanned this time and the division method selected by a user this time in association with each other. Details of the division setting information will be described later. Further, at S520, information representing the feature of the image of the new business form scanned this time and the user having logged in this time or the button 601 selected this time are stored in association with the formID.

The MFP cooperative server 120 notifies the MFP 110 that the processing is completed in a case where the processing of division and file generation is completed. The processing of the MFP 110 in a case where there is a plurality of business forms scanned this time and there is a similar business form will be explained in FIG. 12.

At S521, upon receipt of the notification of division processing completion, the cooperative service request unit 423 of the MFP 110 transmits instructions to perform file transmission to the cloud storage server 130 to the MFP cooperative server 120. Then, at S522, the display control unit 421 of the MFP 110 displays a transmission processing-in-progress screen on the operation unit 220 of the MFP 110.

Although detailed explanation is omitted, it may also be possible to enable a user to set the storage destination, the file name and the like for the individual generated files by displaying a screen for setting the storage destination, the file name and the like of the generated file on the operation unit 220 of the MFP 110 before the processing at S521. Here, for simplification of explanation, explanation is given on the assumption that a file naming rule (for example, file names are generated by adding consecutive numbers to scan dates) of a file name that is set in advance in association with the button 601 and a storage destination folder path are utilized.

At S523, upon receipt of the instructions to perform transmission, theMFP cooperative server 120 transmits the generated file to the cloud storage server 130. After that, upon receipt of a notification to the effect that the storage of the file is completed normally from the cloud storage server 130, the MFP cooperative server 120 notifies the MFP 110 that the transmission is completed.

At S524, upon receipt of the notification of transmission completion, the display control unit 421 of the MFP 110 displays a message, not shown schematically, indicating that the transmission is completed on the operation unit 220 and the screen returns to the initial Scan button selection screen 600.

[Details of Analysis Processing for Scanned Image]

Figure 10:
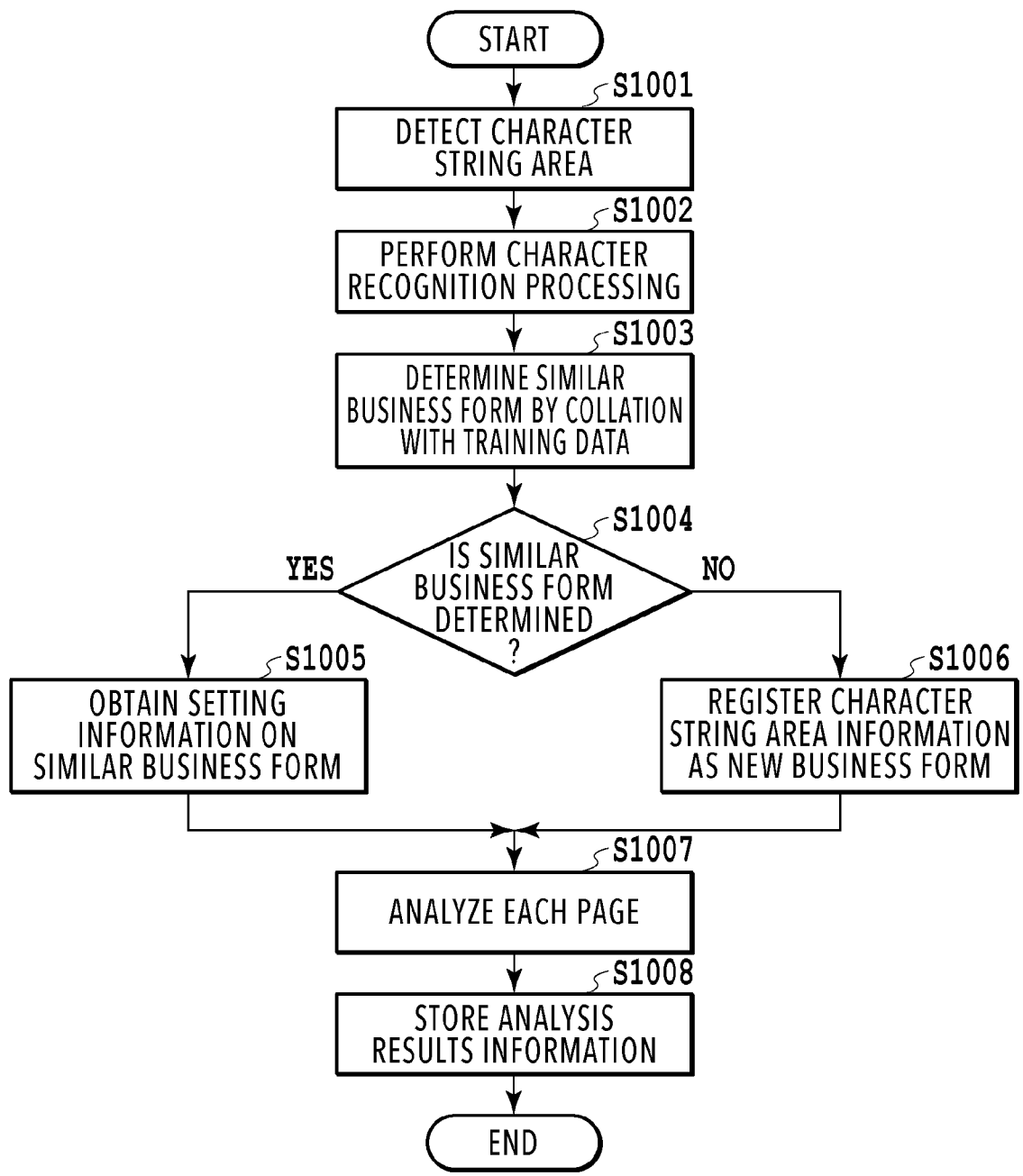
FIG. 10 is a flowchart showing details of image analysis processing.

FIG. 10 is a flowchart for explaining details of the analysis processing (S512) that is performed in the MFP cooperative server 120. That is, the details of the analysis processing that is performed in the MFP cooperative server 120 after the image processing unit 432 of the MFP cooperative server 120 receives the request for image processing from the request control unit 431. The series of processing shown in the flowchart in FIG. 10 is performed by the CPU of the MFP cooperative server 120 reading a program code stored in the ROM or HDD onto the RAM and executing the program code. Further, it may also be possible to implement part or all of the steps in FIG. 10 by hardware, such as an ASIC and an electronic circuit. A symbol "S" in the explanation of each piece of processing means that the step is a step in this flowchart. Each step is explained on the assumption that scanned images of each page obtained by scanning a plurality of business forms collectively are analyzed.

At S1001, the image processing unit 432 of the MFP cooperative server 120 obtains the analysis-target scanned images relating to the analysis request. Then, the image processing unit 432 detects character string areas existing in the analysis-target scanned images obtained by performing a scan at S509. Due to this, the arrangement and size of the character strings included within the analysis-target scanned images are specified.

At S1002, the image processing unit 432 performs character recognition processing for the character string areas detected by analyzing the scanned images at S1001.

At S1003, the image processing unit 432 performs business form determination processing for a predetermined page of the analysis-target scanned images. In the business form determination processing, the arrangement information on the character string areas of the scanned image of the analysis-target scanned images obtained as a result of the processing at S1001 and the arrangement information on the character string areas of the previous scanned image managed as training data are compared. Then, whether the arrangements of the character string areas are the same or similar is determined. This is based on the fact that it is possible to estimate that, in a case where the arrangements of the character string areas are the same or similar, those business forms are business forms of the same type created by using the same document form (form of business form).

In a case where the scanned images of each page are the analysis target, the arrangement information is compared between the character string areas of the scanned image of the first page of the scanned images of each page and the character string areas of each of the registered scanned images registered as training data. Then, whether the arrangements of the character string areas are the same or similar is determined. It is assumed that the arrangement information on the character string areas of the first page is also registered for the registered previous scanned image.

Then, in a case where there is any of registered previous scanned images whose arrangement information is similar, the registered previous scanned image is determined as the image of the similar business form (simply described as similar business form). In a case where the similar business form is determined, formID associated with the determined similar business form is associated with the analysis-target scanned images obtained by performing a scan this time.

At S1004, whether the similar business form is determined as a result of the processing at S1003 is determined. In a case where the similar business form is determined (YES at S1004), the processing advances to S1005.

At S1005, the image processing unit 432 obtains the setting information stored in association with formID of the determined similar business form. In the present embodiment, as the setting information, at least the division method stored in association with the similar business form is obtained.

In a case where a new business form was scanned previously, as described previously, the division method selected by a user is stored in the division setting information (see FIG. 13) in association with formID (S520 in FIG. 5). Because of this, it is possible to obtain the division method used previously for the similar business form by obtaining the division method stored in association with formID of the similar business form from the division setting information.

In a case where the similar business form is not determined at S1004 (NO at S1004), the processing advances to S1006. At S1006, the image processing unit 432 associates a new formID with the analysis-target scanned images by taking the analysis-target scanned images as the image of a new business form (business form without similar business form). Then, the image processing unit 432 causes the data management unit 434 to perform the registration of the new business form. For example, the arrangement information on the character string areas obtained by the analysis processing is registered in association with the new formID. In a case where the scanned images of each page are the analysis target, the arrangement information on the character string areas of the scanned image as the first page is stored. The registered information is used as one piece of information that is compared with the analysis-target scanned image in a case where the similar business form determination in the analysis processing of the next time and later is performed.

At S1007, the image processing unit 432 performs the analysis processing that is necessary for division processing for each scanned image configuring the scanned images of each page, which are the analysis target this time. In a case where the analysis-target scanned images of this time are determined to be the new business form without similar business form, for example, the scanned images of each page are analyzed and whether there is a page the same as or similar to the first page, whether there is a page including a barcode, whether there is a blank page, and so on are analyzed. In the determination method of a page the same as or similar to the first page, the page the same as or similar to the first page is determined by performing the similar business form determination by the same method as that at S1003 for the scanned image of the first page of the scanned images of each page obtained by performing a scan this time and the scanned image of each page. On the other hand, in a case where the analysis-target scanned images are determined to have a similar business form, at S1007, only the analysis necessary for performing the division method associated with the similar business form is performed.

At S1008, the image processing unit 432 stores the analysis results information generated at S1007 in the HDD within the MFP cooperative server 120.

[About Analysis Results Information]

FIG. 11A to FIG. 11C are each a diagram showing an example the analysis results information as a table, which is generated at S1007 in FIG. 10 and stored in the HDD within the MFP cooperative server 120. Information contents held as the analysis results information are explained by using analysis results information in FIG. 11A.

In "Key" in a column 1101 of the table showing the analysis results information, items are held and in "Value" in a column 1102, values corresponding to the items are held.

As a value corresponding to "matched", which is the item in a row 1103, a value is held, which indicates whether the registered previous scanned image (similar business form) similar to the scanned image of the first page of the scanned images of each page obtained by performing a scan this time is determined. In a case where the similar business form is determined, the value is "TRUE" and the value in a case where there is no similar business form is "FALSE". Based on the results of the processing at S1003, "TRUE" or "FALSE" is held. For example, the matching rate between the arrangement information on the previous scanned image and the arrangement information on the scanned image of the first page obtained by performing a scan this time is indicated by a real value from 0 to 1. The higher the matching rate, the more similar the business form is and "TRUE" or "FALSE" is determined in accordance with whether or not a threshold value is exceeded.

As a value corresponding to "formID", a value (formID) uniquely indicating the type of form of business form of the scanned image of the first page obtained by performing a scan this time is held. In a case where the similar business form corresponding to the scanned image of the first page of the analysis-target scanned images is determined, to the analysis-target scanned images also, the same formID as that of the determined similar business form is allocated and they are held in the column 1102.

As a value corresponding to "Division method", which is the item in a row 1105, a value indicating the division method associated with formID is held. In a case where the similar business form is not determined, there is no division method associated with formID, and therefore, a value of "Undefined" is held. In a case where the similar business form is determined, a value indicating the division method used previously for the similar business form is held. Each value indicating the division method is "Same" for the division method by "Page similar to business form of first page", "Barcode" for the division method by "Page with barcode", and "Blank" for the division method by "Blank page". Further, a value for the division method by "Arbitrary number of pages" is "N".

As a value corresponding to "Same pages", which is the item in a row 1106, a value of the page number of the scanned image of the page is held, which is similar to the scanned image of the first page. As a value corresponding to "Barcode pages", which is the item in a row 1107, a value of the page number of the page with barcode is held. As a value corresponding to "Blank pages", which is the item in a row 1108, a value of the page number of the blank page is held. As a value corresponding to "N pages", which is the item in a row 1109, in a case where the similar business form is determined and the division method designated for the similar business form is "Arbitrary number of pages", a value of the number of pages designated by a user is held. As a value of "All pages", which is the item in a row 1110, a value of the total number of page counts configuring the scanned images of each page obtained by performing a scan this time is held.

In the analysis results information in FIG. 11A, as the value of "matched", "FALSE" is held, and therefore, the analysis results information in FIG. 11A indicates the analysis results information generated for the scanned images for which the similar business form is not determined. Because of this, as the value of "Division method", "Undefined" is held. As the value of each item from "Same pages" to "Blank pages", the value indicating the page detected as a result of the analysis for each page at S1007 is held. From the analysis results information in FIG. 11A, it can be seen that the page that is used in a case where each division method is performed can be detected.

The analysis results information in FIG. 11B is an example of the analysis results information in a case where the similar business form is not determined like the analysis results information in FIG. 11A. However, as the value of each item from "Same pages" to "Blank pages", the value indicating a page is not held. Because of this, it can be seen that the page that is used in a case where those division methods are performed does not exist.

In the analysis results information in FIG. 11C, as the value of "matched", "TRUE" is held. Because of this, the analysis results information in FIG. 11C indicates the analysis results information in a case where the similar business form is determined. As the value of "formID", formID of the similar business form is held. As the value of "Division method", "Same" is held, and therefore, it can be seen that the division method by "Page similar to business form of first page" has been selected previously for the similar business form. In a case where the similar business form is determined, it is not necessary to detect the page that is used in the division method other than the division method stored in association with the similar business form. That is, in a case where the division method associated with the similar business form is "Page similar to business form of first page", in the analysis relating to each page at S1007, it is not necessary to detect the page other than the page the same as the first page. Because of this, results for the division methods other than "Same pages" are not held. [Division method selection screen display and division execution processing]

Figure 12:
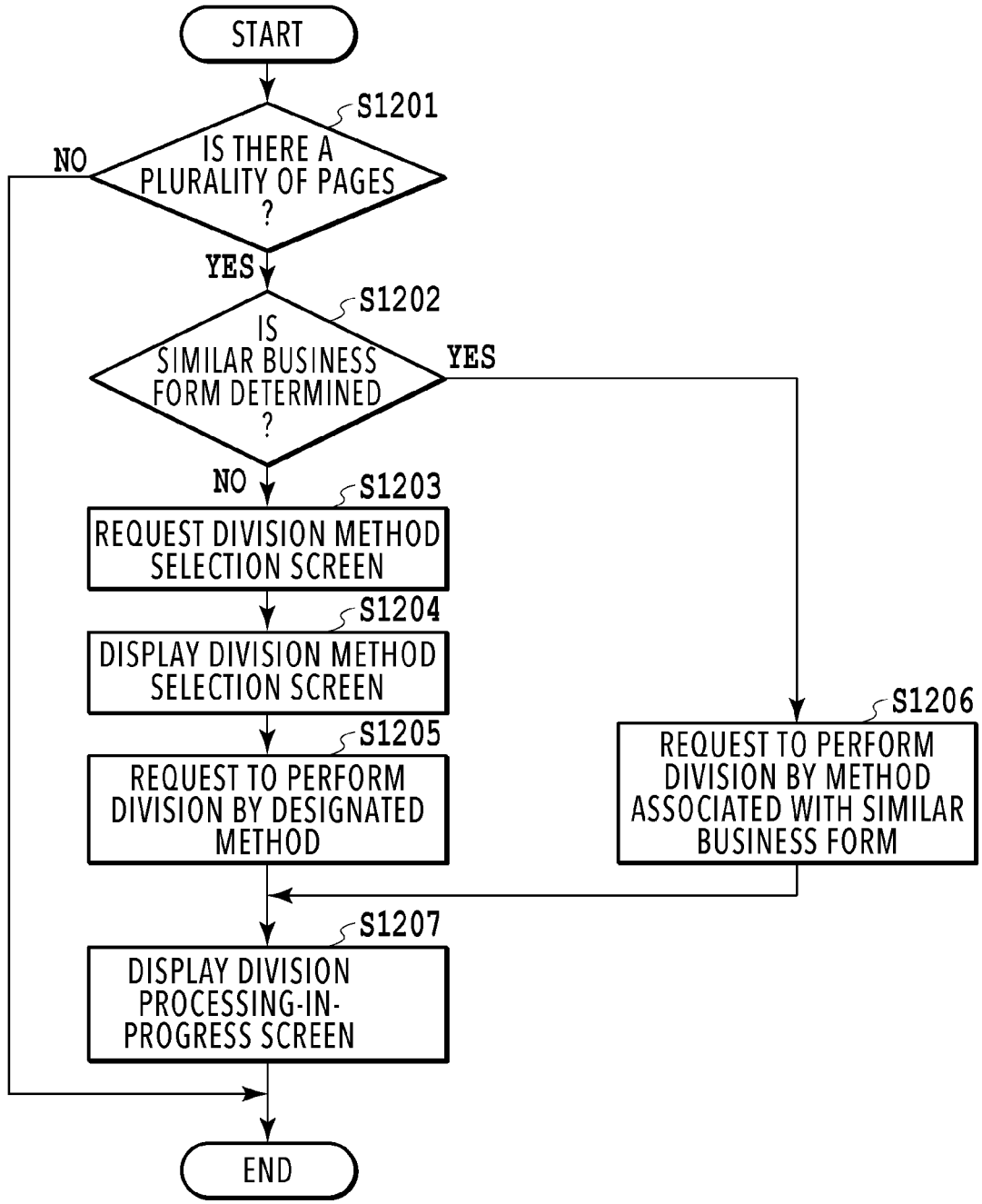
FIG. 12 is a flowchart showing details of processing to determine a division method.

FIG. 12 is a flowchart showing details of processing for displaying the division method selection screen, which is performed by the MFP 110, and processing to give instructions to perform division. Each piece of the processing is implemented by the CPU 211 of the MFP 110 reading a program stored in the ROM 212 or the HDD 214 onto the RAM 213 and executing the program. This flowchart is a flowchart showing details of processing of the MFP 110 after the analysis results information is obtained at S514 in FIG. 5 and before the transmission execution request is made at S521.

At S1201, the image processing unit 424 determines whether there is a plurality of business forms scanned this time. This determination method is performed by determining whether is a plurality of business forms scanned this time based on the value "All pages" of the analysis results information obtained from the MFP cooperative server 120 as a result of the transmission request at S514.

In a case where a value larger than or equal to "2" is held as the value of "All pages" (row 1110 in FIG. 11A to FIG. 11C) in the analysis results information, there is a plurality of business forms scanned this time. Because of this, YES is determined at S1201 and the processing advances to S1202.

At S1202, the image processing unit 424 determines whether the previous scanned image (similar business form) similar to the scanned image of the first page of the scanned images obtained by performing a scan this time is determined. This determination method is performed based on the value of "matched" (row 1103 in FIG. 11A to FIG. 11C) of the analysis results information obtained from the MFP cooperative server 120 as a result of the transmission request at S514.

In a case where "FALSE" is held as the value of the item of "matched" of the analysis results information, the similar business form is not determined, and therefore, NO is determined at S1202 and the processing advances to S1203. In a case where the business form scanned this time is a new business form without similar business form, the processing corresponding to S515 to S516 in FIG. 5 is performed.

The processing at S1203 is the processing corresponding to that at S515. At S1203, the cooperative service request unit 423 requests the MFP cooperative server 120 to transmit information necessary for displaying the division method selection screen 800.

The processing at S1204 is the processing corresponding to that at S516. At S1204, the display control unit 421 displays the division method selection screen 800 explained by using FIG. 8A and FIG. 8B using the information necessary for displaying the division method selection screen 800, which is received from the MFP cooperative server 120, and the analysis results information in FIG. 11A to FIG. 11C.

For example, in a case where the analysis results information in FIG. 11A is obtained, at S1204, the division method selection screen 800 in FIG. 8A is displayed. In the analysis results information in FIG. 11A, the value indicating the page number corresponding to each item (rows 1106 to 1108) from "Same pages" to "Blank pages" is held. In this case, the buttons 802 to 804 are displayed so that all the division methods corresponding to "Same pages" to "Blank pages" can be selected. The button 805 is a button designating the division method for each number of pages designated by a user and it is possible to perform division without using the analysis results information, and therefore, the button 805 is displayed irrespective of the obtained analysis results information.

The division method selection screen 800 in FIG. 8A is in the state where the button 802 is pressed down and the division method by "Page similar to business form of first page" is selected and in the display area 806, "5" is displayed, which is the number of files after the division. The number of files after the division is calculated based on the value of "All pages" and the value of "Same pages" in FIG. 11A. In a case of FIG. 11A, as the value of "All pages", "13 is held and as the value of "Same pages", the values of "3, 6, 7, 10" are held. Because of this, the scanned images of 13 pages are divided and the scanned images of the first page and the second page are taken as one file. Similarly, the scanned images of each of the third page to the fifth page, the sixth page, the seventh page to the ninth page, and the tenth page to the thirteenth page are taken as one file, respectively, and thus, the scanned images are divided into five files. In a case where a user presses down the button 803 on the division method selection screen 800 in FIG. 8A, from the value of "All pages" and the values of "Barcode pages", as the number of files after the division, "3" is displayed in the display area 806. As described above, based on the analysis results information shown in FIG. 11A to FIG. 11C or the number of pages designated by a user with the button 805, the number of files after the division is calculated.

The division method selection screen 800 in FIG. 8B is the division method selection screen in a case where the analysis results information received from the MFP cooperative server 120 is that shown in FIG. 11B. In the analysis results information in FIG. 11B, the value is not held in the items (rows 1106 to 1108) corresponding to "Same pages" to "Blank pages". That is, the page similar to the first page, the page with barcode, or the blank page is not detected, and therefore, the value is not held. Because of this, it is not possible to perform division by the division methods that use those pages. In this case, as shown on the division method selection screen 800 in FIG. 8B, the division methods are narrowed to those that can be used for the scanned images obtained by performing a scan this time and the buttons for selecting the division method are displayed. By narrowing the division methods that can be selected by a user to the division methods that can be used, it is possible to suppress a user from selecting the division method that cannot be used.

The processing at next S1205 is the processing corresponding to that at S517. In a case where a user presses down the Transmit button 808 on the division method selection screen 800 in FIG. 8A and FIG. 8B, at S1205, the cooperative service request unit 423 of the MFP 110 requests the MFP cooperative server 120 to perform division by the division method selected by a user. In the MFP cooperative server 120, the request control unit 431 receives the division method selected by a user from the MFP 110 and the image processing unit 432 generates a file by dividing the scanned images by the division method selected by a user (S519 in FIG. 5).

The data management unit 434 issues a new formID. Then, the feature information on the scanned image of the first page obtained by performing a scan this time and the division method selected by a user this time are associated with the formID and stored in the division setting information stored in the HDD of the MFP cooperative server 120 (S520). Due to this, in a case where the business form whose form of business form is the same as that of the business form scanned this time is scanned the next time or later, it is possible to automatically reflect the division method selected by a user this time.

On the other hand, in a case where as the value of the item of "matched" of the analysis results information, "TRUE" is held, the similar business form is determined, and therefore, by the determination at S1202, YES is determined. In this case, the processing advances to S1206. S1206 is the step corresponding to S517 in FIG. 5 in a case where the similar business form is determined.

At 51206, the cooperative service request unit 423 of the MFP 110 requests the MFP cooperative server 120 to perform division by the division method indicated by the value of "Division method" (row 1105 in FIG. 11C) of the analysis results information obtained from the MFP cooperative server 120. In a case where the similar business form is determined, the processing at S515 and S516 in FIG. 5 is not performed. Because of this, it is not necessary for a user to select the division method on the division method selection screen 800, and therefore, the time and effort of a user are reduced. Then, in the MFP cooperative server 120, after receiving the instructions to perform division, the image processing unit 432 performs division by the division method associated with the similar business form and generates a file (S519 in FIG. 5). In a case where YES is determined at S1202, the processing to store the division method at S520 in FIG. 5 is skipped. The step at 51206 may be omitted. For example, in a case where the similar business form is determined at S512 and the division method is associated with the similar business form, the MFP cooperative server 120 may perform division by the division method associated with the similar business form without a request from the MFP 110.

The processing at S1207 is the same as that at S518, and therefore, explanation is omitted.

On the other hand, in a case where "1" is held as the value of the item of "All pages", there is one business form scanned this time, not a plurality of business forms, and therefore, at S1201, NO is determined. Consequently, the division processing is not performed and this flowchart terminates and the processing at S521 and subsequent steps in FIG. 5 is performed.

Explanation is given on the assumption that the determination of whether there is a plurality of business forms scanned this time is performed based on the analysis results information that is obtained after S514 in FIG. 5, but it may also be possible to perform the determination based on the number of business forms scanned from the ADF at the time of performing the scan at S509 in FIG. 5. In a case where it is determined that there is not a plurality of business forms scanned this time at S509 in FIG. 5 and the results of the analysis processing are not utilized in processing other than the division processing, the processing from at S511 to the step before S521 may be skipped. [Management of division setting information]

FIG. 13 is a diagram for explaining the division setting information. The division setting information is information for managing the division method selected by a user for the new business form scanned this time in association with formID of the new business form. As shown in FIG. 13, the division setting information is managed, for example, in a table. The division setting information is stored in the HDD of the MFP cooperative server 120 via the data management unit 434 of the MFP cooperative server 120. Further, the division setting information is created for each scan button shown in FIG. 6B.

In the table showing the division setting information, a column 1301 is a column that holds the value of FormID. In a case where the similar business form is determined to be a new business form as a result of the similar business form determination (S1003) in the analysis processing, a new formID is issued. A column 1302 is a column that holds the division method associated with formID. In the column 1302, the value indicating the division method selected previously by a user on the division method selection screen 800 in FIG. 8B is held. A column 1303 is a column that holds the number of pages that is input by a user in a case where the division method indicated by the value held in the column 1302 indicates "Arbitrary number of pages".

In a column 1304, a value (user name) identifying a user who first stored the division method in association with formID in the column 1301 is held. By utilizing the information held in the column 1304, it is possible to narrow the utilization range of the division method associated with formID for each user. In a case where the division method used by a user is different for each user utilizing the business form even though the format of the business form is the same, it is sufficient to reflect the division method for each user. It may also be possible to make it possible to set, in the MFP cooperative server 120, whether to utilize the division method held in association with formID for each user or utilize it for each scan button in FIG. 6B.

In a column 1305, a value indicating information on a group to which the user whose user name is held in the column 1304 belongs is held. By using this information, such an operation in which the same division method is applied only to a specific group may be enabled. The configuration may be such that the division setting information is accessible by accessing the MFP cooperative server 120 from a browser or the like of the client PC. In this case, the configuration may be such that it is possible for a user for whom access has been permitted to edit, delete, and copy the division setting information. Due to this, in a case where the utilization method is changed, it is possible to change the division setting information in accordance with a new operation.

As explained above, according to the present embodiment, in a case where the form of business form of the first page of the business form that is scanned this time is the same as that of the business form that was scanned previously, it is possible to automatically reflect the same division method as that of the previous time. As a method of reducing the time and effort of a user, such an effective application is also contemplated in which one of the division methods is fixed. However, the effective application such as that becomes inconvenient in a case where a user desires to utilize a different division method for a new business form.

In the present embodiment, it is possible to reduce the load to designate the division method each time while maintaining the flexibility for a user to designate the division method for each business form.

The above-described explanation is given on the assumption that the division method selection screen 800 in FIG. 8A and FIG. 8B is displayed in a case where the similar business form is not determined. In addition to this, it may also be possible to display the division method selection screen 800 in FIG. 8A and FIG. 8B also in a case where the similar business form is determined. In this case, it may also be possible to display the division method selection screen 800 in the state where the division method associated with the similar business form is selected. By displaying the division method selection screen 800 in this manner, it is possible to reduce the time and effort of a user for switching the division methods on the division method selection screen 800 compared to the case where the division method selection screen 800 is displayed in the state where the division method is not selected. Further, by displaying the division method selection screen 800 also in a case where the similar business form is determined, it is possible to secure the flexibility to be capable of changing the division method registered once at any time.

Second Embodiment

In the first embodiment, the aspect is explained in which a user selects the division method via the MFP 110. In the present embodiment, an aspect is explained in which a user selects the division method via the client PC 111. The present embodiment is explained by focusing mainly on differences from the first embodiment. The portions not clearly described particularly are the same configurations and processing as those of the first embodiment.

FIG. 1B is a diagram showing the configuration of the image processing system of the present embodiment. The image processing system has the client PC (personal computer) 111, in addition to the MFP 110, the MFP cooperative server 120, and the cloud storage server 130.

The hardware configuration of the client PC 111 is the same as the configuration of the MFP cooperative server 120 shown in FIG. 3, and therefore, explanation is omitted. It is assumed that the client PC 111 has the functions that are implemented by the above-described additional function unit 420 and the like. In a case where the setting or the like for the scanned image is performed in the client PC 111, it may also be possible to design the configuration in which a program (module) for performing the setting is installed in advance in the client PC 111, but the configuration is not limited to this. For example, it may also be possible to perform the setting by obtaining a web application for performing the setting from the MFP cooperative server 120 by utilizing a general-purpose web browser comprised by the client PC 111.

Further, it is assumed that the client PC 111 is connected to a display device, not shown schematically, and a screen, to be described later, is displayed on the display device. The CPU of the client PC 111 also functions as a display control unit configured to control the screen that is displayed on the display device.

[Flow of General Processing]

Figure 14A:
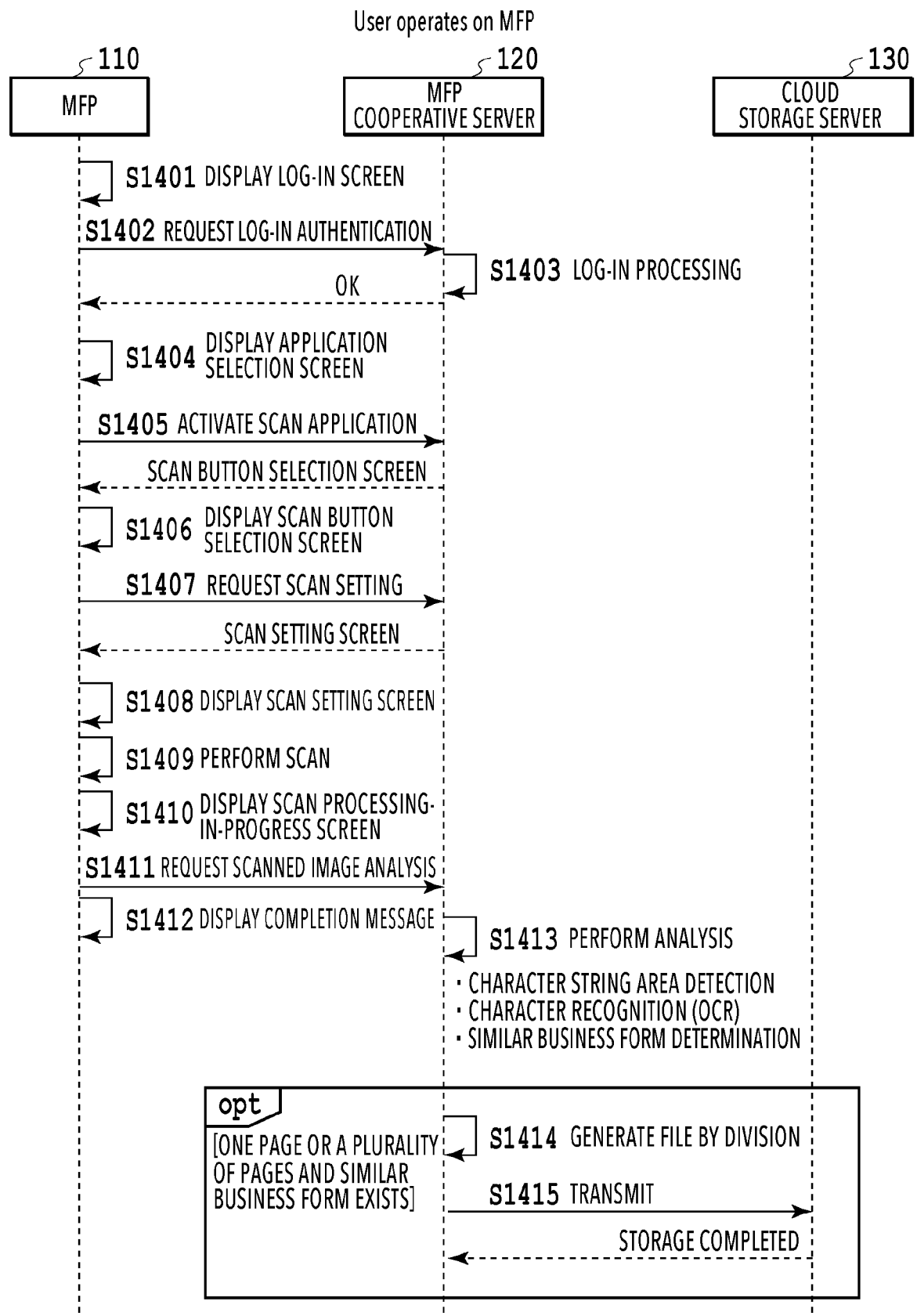
FIG. 14A is a sequence diagram showing a flow of processing between each apparatus.
Figure 14B:
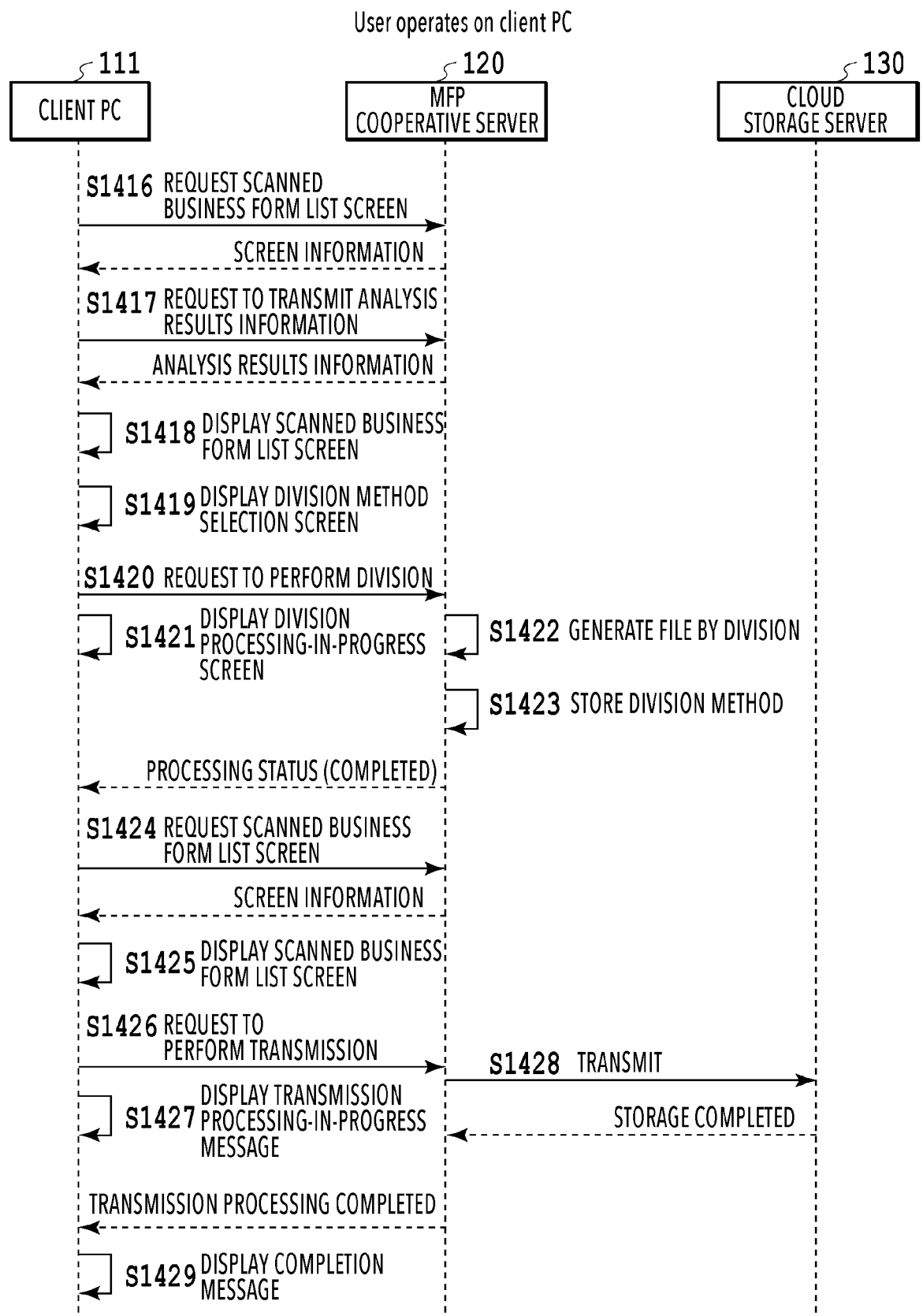
FIG. 14B is a sequence diagram showing a flow of processing between each apparatus.

FIG. 14A and FIG. 14B are each a sequence diagram showing a flow of processing between each apparatus at the time of filing a scanned image obtaining by performing a scan in the MFP 110 and transmitting the file to the cloud storage server 130. FIG. 14A shows the flow until a business form is scanned in the MFP 110 and a request for scan analysis is made to the MFP cooperative server 120. S1401 to S1411 are the same as S501 to S511 in FIG. 5, and therefore, explanation is omitted. There is a case where FIG. 14A and FIG. 14B are called together FIG. 14.

At S1412, the display control unit 421 of the MFP 110 displays a message on the operation unit 220, which indicates that the transmission to the MFP cooperative server 120 is completed after the request to analyze a scanned image is made. At this step, the operation of a user in the MFP 110 is completed.

At S1413, as at S512, the analysis processing is performed for the scanned image obtained by performing a scan this time. However, the check processing of the processing status performed at S513 to S513' is not performed.

In a case where it is determined that there is a similar business form as a result of the similar business form determination in the analysis processing, the processing at S1414 to S1415 is performed. At S1414, the MFP cooperative server 120 performs the division of the scanned images of each page by the division method associated with the similar business form and the file generation.

At S1415, the MFP cooperative server 120 transmits the generated file to the cloud storage server 130 and in a case where the file is stored in the cloud storage server 130, the processing is completed. Further, in a case where there is only one business form scanned this time, the scanned image is filed at S1414 and the file of the scanned image is transmitted at S1415.

On the other, in a case where the similar business form determination in the analysis processing at S1413 is completed and the similar business form is not determined, the analysis-target scanned images remain in the MFP cooperative server 120 as they are.

FIG. 14B is a sequence diagram showing processing after the processing in FIG. 14A in a case where there is a plurality of business forms scanned this time and the business form is a new business form without similar business form. FIG. 14B differs from FIG. 5B in that the selection of the division method is performed in the client PC 111. Explanation is given on the assumption that the processing of the client PC 111 in FIG. 14B is performed by the CPU of the client PC 111 reading a program code stored in the ROM or the HDD onto the RAM and executing the program code. In addition to this, it may also be possible to implement part or all of the functions at the steps by hardware, such as an ASIC and an electronic circuit.

At S1416, the CPU of the client PC 111 requests the MFP cooperative server 120 to transmit information necessary for displaying the scanned business form list screen. This step is performed by a user accessing the MFP cooperative server 120 by using a browser of the client PC 111, or the like.

Further, at S1417, the CPU of the client PC 111 requests the MFP cooperative server 120 to transmit analysis results information.

The display control unit 435 of the MFP cooperative server 120 transmits information necessary for displaying the scanned business form list screen to the client PC 111, such as information on the scanned image for which the similar business form determination in the analysis processing at S1413 is completed and the similar business form is not determined. Further, the display control unit 435 transmits the analysis results information to the client PC 111.

At S1418, the CPU of the client PC 111 performs control to display the scanned business form list screen on the display device based on the information for displaying the scanned business form list screen received from the MFP cooperative server 120.

Figure 15A:
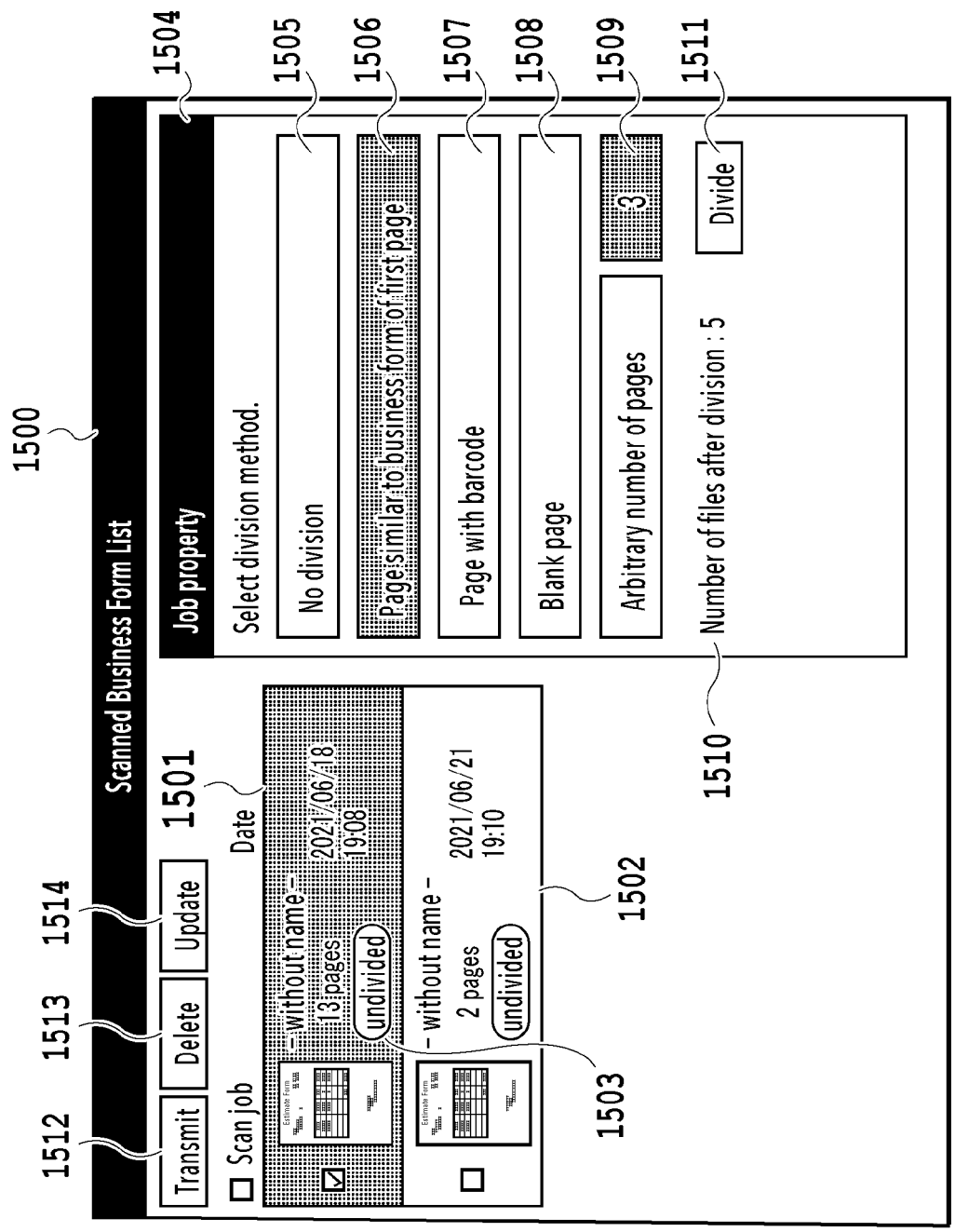
FIG. 15A and FIG. 15B are each a diagram showing an example of a Scanned Business Form List screen.
Figure 15B:
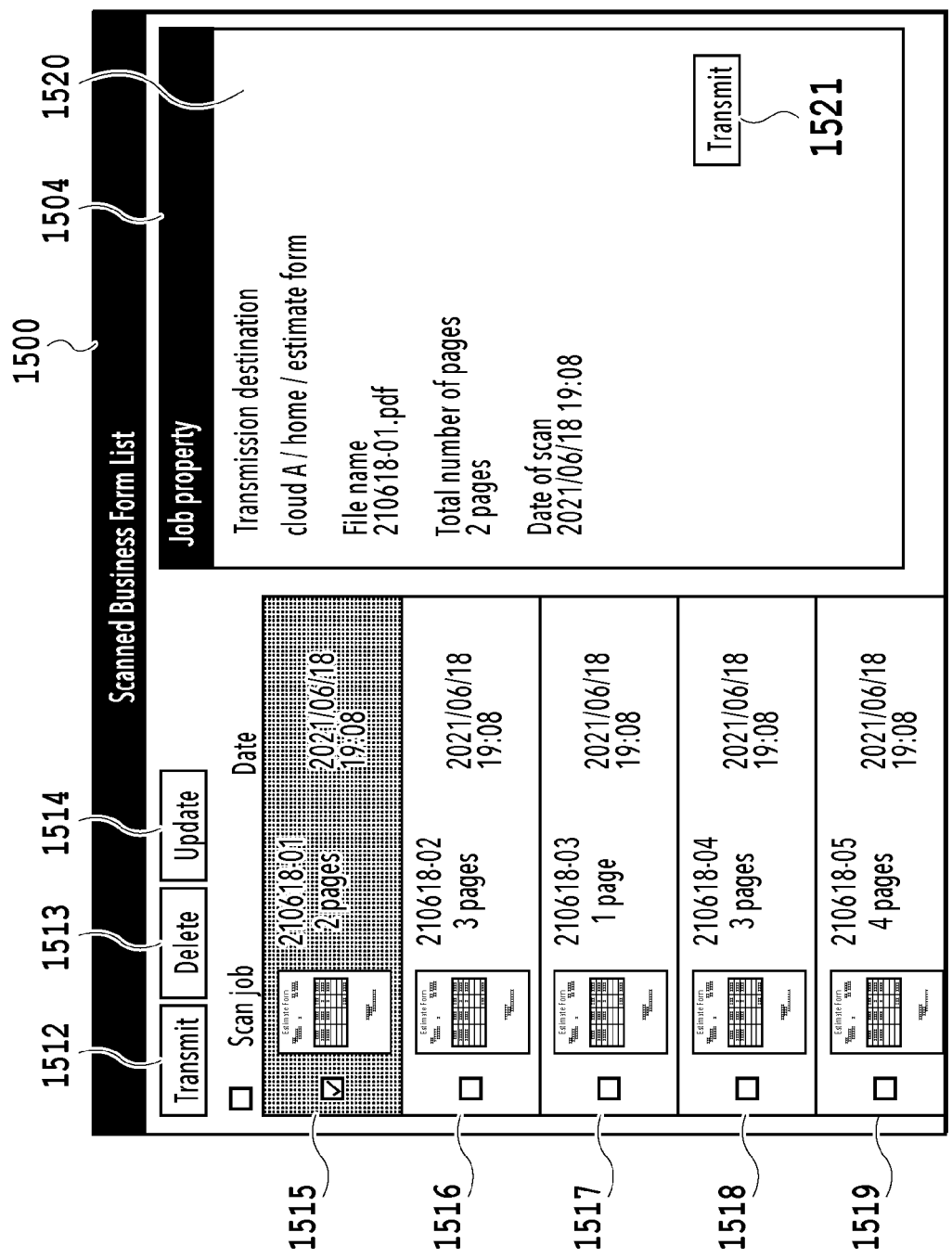

FIG. 15A and FIG. 15B are each a diagram showing an example of a Scanned Business Form List screen 1500. Areas 1501 and 1502 on the Scanned Business Form List screen 1500 in FIG. 15A are each an area displaying a job corresponding scanned images in which the scanned image for which a similar business form is not determined is the top page and which are not divided yet. A label 1503 is a label indicating that the job is undivided. A property display area 1504 is an area displaying information on the job selected on the Scanned Business Form List screen 1500.

At S1419, the CPU of the client PC 111 displays the division method selection screen based on the analysis results information. In the present embodiment, explanation is given on the assumption that the division method selection screen is displayed in the property display area 1504 within the Scanned Business Form List screen 1500.

On the Scanned Business Form List screen 1500 in FIG. 15A, the job displayed in the area 1501 is selected. Further, based on the analysis results information obtained at S1417, the division method selection screen is displayed in the property display area 1504. The configuration of the division method selection screen that is displayed in the property display area 1504 is the same as that of the division method selection screen 800 in FIG. 8A and FIG. 8B, and therefore, explanation is omitted. Buttons 1505 to 1509 correspond to the button 801 to 805 in FIG. 8A and a display area 1510 corresponds to the display area 806, respectively. A division execution button 1511 is a button for performing the division method selected by a user.

A Transmit button 1512 is a button for giving instructions to transmit the divided file to the cloud storage server 130. A Delete button 1513 is a button for deleting a selected job. An Update button 1514 is a button for displaying, in a case where there is an undivided job that is not displayed yet, the undivided job by updating the Scanned Business Form List screen 1500.

In a case where a user performs the operation to press down the division execution button 1511, the CPU of the client PC 111 transmits a request to perform division by the division method in accordance with one of the buttons 1505 to 1509 to the MFP cooperative server 120 at S1420. The processing at this step is the same as the processing at S1205 in FIG. 12.

At S1421, the CPU of the client PC 111 displays a division processing-in-progress screen.

At S1422, the MFP cooperative server 120 performs division by the division method selected by a user and generates a file.

At S1423, the data management unit 434 associates the feature information on the scanned image of the first page obtained by performing a scan this time and the division method selected by a user this time with a new formID and stores them in the division setting information stored in the HDD of the MFP cooperative server 120. Then, the data management unit 434 notifies the client PC 111 that the division is completed.

At S1424, upon receipt of the division and file generation completion notification, the CPU of the client PC 111 makes a request again to transmit information necessary for displaying the Scanned Business Form List screen 1500. The display control unit 435 of the MFP cooperative server 120 transmits the file information after the division and the information on the undivided job to the client PC 111.

At S1425, the CPU of the client PC 111 displays the Scanned Business Form List screen 1500 again. FIG. 15B is a diagram showing an example of the Scanned Business Form List screen 1500 after the division is performed. Areas 1515 to 1519 show five files generated by the scanned images corresponding to the job displayed in the area 1501 in FIG. 15A being divided. Each file name displayed in the areas 1515 to 1519 indicates the file name in a case where the file name that is set in advance in association with the scan button in FIG. 6A and FIG. 6B is applied.

Further, the division is completed, and therefore, in FIG. 5B, the label indicating undivided is no longer displayed. Furthermore, in the property display area 1504 that displays job information, the division method selection screen is switched to a property information screen 1520 for a file transmission destination, a file name and the like. The division execution button 1511 is also no longer displayed and instead a Transmit button 1521 is displayed.

At S1426, upon receipt of the pressing down of the Transmit button 1521 by a user, the CPU of the client PC 111 transmits instructions to transmit a file to the cloud storage server 130 to the MFP cooperative server 120.

At S1427, the CPU of the client PC 111 displays a message indicating that transmission is in progress on the display device.

At S1428, upon receipt of the instructions to perform transmission, theMFP cooperative server 120 transmits the generated file to the cloud storage server 130. After that, upon receipt of the notification to the effect that the storage of the file is completed normally from the cloud storage server 130, the MFP cooperative server 120 notifies the client PC 111 that the transmission is completed.

At S1429, upon receipt of the transmission completion notification, the CPU of the client PC 111 display a message, not show schematically, indicating that the transmission is completed on the display device.

As explained above, according to the present embodiment, it is possible for a user to perform the operation to select the division method in the client PC 111. Because of this, it is possible for a user to complete the work in the MFP 110 more quickly than in the first embodiment. Then, it is possible for a user to give instructions collectively, such as instructions to perform division, in the client PC 111

In the present embodiment, explanation is given on the assumption that the setting of a transmission destination or a file name is performed in advance, but it may also be possible to enable a user to change the setting in the client PC 111. In such a case, it may also be possible to display the job of scanned images for which division is not necessary and the job of scanned images for which there is a similar business form and which are divided also on the Scanned Business Form List screen.

According to the technique of the present invention, it is possible to reduce the time and effort of a user to select the division method.

Other Embodiments

In the embodiments described above, explanation is given on the assumption that the analysis processing and the division processing for the scanned images are performed by the image processing unit 432 of the MFP cooperative server 120, but the processing may be performed by the image processing unit 424 of the MFP 110.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-079398 filed May 13, 2022, which are hereby incorporated by reference wherein in their entirety.

What is claimed is:

1. An image processing apparatus comprising:
at least one memory that stores instructions; and
at least one processor that executes the instructions to:
obtain scanned images of each page obtained by scanning business forms including a plurality of pages or business forms of different types collectively;
manage a division method associated with feature information on each of previous scanned images and the previous scanned images;
analyze, based on the feature information, whether any of the previous scanned images similar to a scanned image of the first page of the obtained scanned images exists; and
divide, in a case where any of the previous scanned images similar to the scanned image of the first page exists, the obtained scanned images by a division method associated with the previous scanned image similar to the scanned image of the first page.

2. The image processing apparatus according to claim 1, wherein
in a case where any of the previous scanned images similar to the scanned image of the first page does not exist, the division is performed by receiving a division method selected by a user and dividing the obtained scanned images by the received division method.

3. The image processing apparatus according to claim 2, wherein the least one processor further executes the instructions to:
transmit information necessary for displaying a screen on which for the user to select a division method to an information processing apparatus; and receive the division method selected by the user via the screen displayed by the information processing apparatus based on the necessary information.

4. The image processing apparatus according to claim 2, wherein
in a case where any of the previous scanned images similar to the scanned image of the first page does not exist, feature information on a scanned image of the first page of the obtained scanned images of each page by scanning the business forms including a plurality of pages or the business forms of different types collectively and the division method selected by the user in association with a value indicating the scanned image of the first page are registered.

5. The image processing apparatus according to claim 1, wherein
the managed division method is further associated with information on a user having selected the division method.

6. The image processing apparatus according to claim 1, wherein the least one processor further executes the instructions to:
transmit each piece of data obtained by dividing the scanned images to a cloud service.

7. The image processing apparatus according to claim 1, wherein
the feature information is arrangement information on a character string area.

8. An information processing apparatus that transmits a division method to an image processing apparatus that divides scanned images of each page obtained by scanning business forms including a plurality of pages or business forms of different types collectively, the information processing apparatus comprising:
at least one memory that stores instructions; and
at least one processor that executes the instructions to:
receive results of analyzing whether any of registered previous scanned images similar to a scanned image of the first page of the obtained scanned images exists; and
transmit, in a case where any of the previous scanned images similar to the scanned image of the first page exists, instructions to divide the obtained scanned images by a division method associated with the previous scanned image to the image processing apparatus.

9. The information processing apparatus according to claim 8, wherein the least one processor further executes the instructions to:
perform control for displaying a screen for a user to select a division method in a case where any of the previous scanned images similar to the scanned image of the first page does not exist; and
transmit instructions to divide the obtained scanned images by the division method selected by the user via the screen to the image processing apparatus.

10. The information processing apparatus according to claim 9, wherein
in the received analysis results, results of analyzing each scanned image configuring the obtained scanned images are further included and
displaying the screen on which the division method in accordance with the received analysis results is performed.

11. The information processing apparatus according to claim 8, further comprising:
a scanner for generating the scanned images by scanning the business forms including a plurality of pages or the business forms of different types collectively, wherein
the scanned images and instructions to analyze the scanned images are transmitted to the image processing apparatus and
the analysis results corresponding to the analysis instructions are received.

12. An image processing system comprising:
at least one memory that stores instructions; and
at least one processor that executes the instructions to:
obtain scanned images of each page obtained by scanning business forms including a plurality of pages or business forms of different types collectively;
manage a division method associated with feature information on each of previous scanned images and the previous scanned images;
analyze, based on the feature information, whether any of the previous scanned image similar to a scanned image of the first page of the obtained scanned images exists; and
transmit, in a case where any of the previous scanned images similar to the scanned image of the first page exists is analyzed, instructions to divide the obtained scanned images by a division method associated with the previous scanned image; and
divide, in a case where any of the previous scanned images similar to the scanned image of the first page exists, the obtained scanned images by the division method.

13. An image processing method comprising:
obtaining scanned images of each page obtained by scanning business forms including a plurality of pages or business forms of different types collectively;
managing a division method associated with feature information on each of previous scanned images and the previous scanned images;
analyzing, based on the feature information, whether any of the previous scanned images similar to a scanned image of the first page of the obtained scanned images exists; and
dividing, in a case where any of the previous scanned images similar to the scanned image of the first page exists, the obtained scanned images by a division method associated with the previous scanned image similar to the scanned image of the first page.

14. An information processing method for transmitting a division method to an image processing apparatus that divides scanned images of each page obtained by scanning business forms including a plurality of pages or business forms of different types collectively, the information processing method comprising:
receiving results of analyzing whether any of registered previous scanned images similar to a scanned image of the first page of the obtained scanned images exists; and
transmitting, in a case where any of the previous scanned images similar to the scanned image of the first page exists, instructions to divide the obtained scanned images by a division method associated with the previous scanned image to the image processing apparatus.

15. A non-transitory computer readable storage medium storing a program which causes a computer to perform an image processing method, the image processing method comprising:

obtaining scanned images of each page obtained by scanning business forms including a plurality of pages or business forms of different types collectively;

managing a division method associated with feature information on each of previous scanned images and the previous scanned images;

analyzing, based on the feature information, whether any of the previous scanned images similar to a scanned image of the first page of the obtained scanned images exists; and dividing, in a case where any of the previous scanned images similar to the scanned image of the first page exists, the obtained scanned images by a division method associated with the previous scanned image similar to the scanned image of the first page.

16. A non-transitory computer readable storage medium storing a program which causes a computer to perform an information processing method for transmitting a division method to an image processing apparatus that divides scanned images of each page obtained by scanning business forms including a plurality of pages or business forms of different types collectively, the information processing method comprising:

receiving results of analyzing whether any of registered previous scanned images similar to a scanned image of the first page of the obtained scanned images exists; and transmitting, in a case where any of the previous scanned images similar to the scanned image of the first page exists, instructions to divide the obtained scanned images by a division method associated with the previous scanned image to the image processing apparatus.

* * * * *